US008312953B1

(12) United States Patent
Panzarella et al.

(10) Patent No.: US 8,312,953 B1
(45) **Date of Patent: *Nov. 20, 2012**

(54) SYSTEM FOR STORING AND RETRIEVING A PERSONAL-TRANSPORTATION VEHICLE

(75) Inventors: Thomas A. Panzarella, Harleysville, PA (US); Thomas A. Panzarella, Jr., Conshohocken, PA (US); Michael T. Martin, Pennsburg, PA (US); John R. Spletzer, Center Valley, PA (US)

(73) Assignee: FS Partners, LLC, Green Lane, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,091

(22) Filed: Jul. 25, 2008

Related U.S. Application Data

(62) Division of application No. 11/215,428, filed on Aug. 29, 2005, now Pat. No. 7,594,556.

(60) Provisional application No. 60/692,386, filed on Jun. 20, 2005, provisional application No. 60/605,042, filed on Aug. 27, 2004.

(51) Int. Cl.
*B62D 1/24* (2006.01)

(52) U.S. Cl. ........................................ 180/169; 180/167

(58) Field of Classification Search .......... 180/167–169, 180/907

See application file for complete search history.

(56) References Cited

U.S. PATENT DOCUMENTS 4,096,955 A * 6/1978 Dake .............................. 414/541
4,134,504 A * 1/1979 Salas et al. .................... 414/558
4,517,565 A * 5/1985 Nakamura et al. ........ 340/995.28
4,616,972 A * 10/1986 McFarland ................. 414/749.1
4,685,860 A * 8/1987 McFarland ..................... 414/720
4,738,581 A * 4/1988 Kuhlman ...................... 414/462
4,766,421 A * 8/1988 Beggs et al. .................. 340/904
4,796,198 A * 1/1989 Boultinghouse et al. ....... 701/23
4,865,452 A * 9/1989 Ljung et al. .................... 356/468
4,907,936 A * 3/1990 Bourdage ..................... 414/545
5,079,500 A * 1/1992 Oswald .......................... 323/364
5,180,275 A * 1/1993 Czech et al. .................. 414/541
5,308,214 A * 5/1994 Crain et al. ................... 414/541
5,363,933 A * 11/1994 Yu et al. .......................... 180/6.5
5,373,915 A * 12/1994 Tremblay ...................... 187/201
5,477,459 A * 12/1995 Clegg et al. ................... 701/300
5,482,424 A * 1/1996 Jones et al. ................... 414/462
5,734,515 A * 3/1998 Shaffer ......................... 359/857

(Continued)

OTHER PUBLICATIONS

U.S. Appl. No. 10/860,859, filed Jun. 3, 2004, Panzarella et al.

(Continued)

*Primary Examiner* — J. Allen Shriver, II
*Assistant Examiner* — Travis Coolman
(74) *Attorney, Agent, or Firm* — Fox Rothschild LLP

(57) ABSTRACT

A preferred embodiment of a system for automatically transferring a personal-transportation vehicle, such as a power chair, between a first and a second position proximate a motor vehicle such as a minivan is provided. The system can be used to transfer the personal-transportation vehicle between a first position on a lift and carrier assembly mounted on the motor vehicle, and a second position proximate a door of the motor vehicle, so that the user can transfer to and from the personal-transportation vehicle with minimal physical effort and movement. The system can generate guidance information for the personal-transportation vehicle based on position information generated by sensors located on one or both of the personal-transportation vehicle and the motor vehicle.

13 Claims, 36 Drawing Sheets

U.S. PATENT DOCUMENTS

| | | | | | |
|---|---|---|---|---|---|
| 5,746,563 | A * | 5/1998 | Steckler | 414/462 |
| 5,767,905 | A * | 6/1998 | Archambo | 348/373 |
| 6,062,805 | A * | 5/2000 | Tremblay et al. | 414/540 |
| 6,078,849 | A * | 6/2000 | Brady et al. | 701/28 |
| 6,135,228 | A * | 10/2000 | Asada et al. | 180/204 |
| 6,389,334 | B1 * | 5/2002 | Castor | 701/3 |
| 6,435,804 | B1 * | 8/2002 | Hutchins | 414/540 |
| 6,692,215 | B1 | 2/2004 | Panzarella et al. | |
| 6,720,874 | B2 * | 4/2004 | Fufido et al. | 340/541 |
| 6,753,765 | B2 * | 6/2004 | Masuda | 340/435 |
| 6,837,666 | B1 | 1/2005 | Panzarella et al. | |
| 6,842,692 | B2 * | 1/2005 | Fehr et al. | 701/200 |
| 6,860,350 | B2 * | 3/2005 | Beuhler et al. | 180/167 |
| 6,887,027 | B2 * | 5/2005 | O'Leary et al. | 414/462 |
| 7,031,525 | B2 * | 4/2006 | Beardsley | 382/199 |
| 7,043,084 | B2 * | 5/2006 | Beardsley | 382/224 |
| 7,079,669 | B2 * | 7/2006 | Hashimoto et al. | 382/118 |
| 7,164,784 | B2 * | 1/2007 | Beardsley | 382/154 |
| 7,383,107 | B2 * | 6/2008 | Fehr et al. | 701/25 |
| 7,464,776 | B2 | 12/2008 | Heine | |
| 7,594,556 | B1 * | 9/2009 | Panzarella et al. | 180/169 |
| 2002/0049530 | A1 * | 4/2002 | Poropat | 701/207 |
| 2002/0067259 | A1 * | 6/2002 | Fufidio et al. | 340/541 |
| 2003/0165376 | A1 * | 9/2003 | Bruno et al. | 414/462 |
| 2004/0022431 | A1 * | 2/2004 | Beardsley | 382/154 |
| 2004/0022437 | A1 * | 2/2004 | Beardsley | 382/199 |
| 2004/0022439 | A1 * | 2/2004 | Beardsley | 382/224 |
| 2004/0118624 | A1 * | 6/2004 | Beuhler et al. | 180/167 |
| 2004/0267442 | A1 * | 12/2004 | Fehr et al. | 701/200 |
| 2005/0019125 | A1 | 1/2005 | Panzarella et al. | |
| 2008/0035402 | A1 * | 2/2008 | Amira et al. | 180/211 |

OTHER PUBLICATIONS

U.S. Appl. No. 11/177,128, filed Jul. 8, 2005, Panzarella et al.

Gina E. Bertocci, et al., "Wheelchair Caster Loading During Frontal Impact," Assistive Technology Journal, vol. 15, No. 2, pp. 105-112 (2003), pub. RESNA. US.

A.K. Das et al., "Real-Time Vision-Based Control of a Nonholonomic Mobile Robot," Proceddings of IEEE International Conference on Robotics & Automation, Seoul, KR, pp. 1714-1719 (2001). KR.

A. Fusiello et al., "Improving Feature Tracking with Robust Statistics," Pattern Analysis & Applications Journal, vol. 2, pp. 312-320 (1999), pub. Springer-Verlag London Ltd. GB.

K. Ashley Rotko et al., "Characteristics of Wheelchair Users and Associated Motor Vehicle Transportation Usage," Proceedings of RESNA 27th Int'l Annual Conference, Orlando, FL (2004). US.

Richard Simpson, et al., "The Smart Wheelchair Component System," Journal of Rehabilitation Research & Development, vol. 41, No. 3B, pp. 429-442, pub. Dept. of Veterans Affairs. US.

* cited by examiner

SYSTEM FOR STORING AND RETRIEVING A PERSONAL-TRANSPORTATION VEHICLE

CROSS-REFERENCE TO RELATED APPLICATIONS

This is a division of U.S. application Ser. No. 11/215,428, filed Aug. 29, 2005, which claims priority under 35 U.S.C. §119(e) to U.S. provisional application No. 60/692,386, filed Jun. 20, 2005 (now abandoned), and U.S. provisional application No. 60/605,042, filed Aug. 27, 2004 . The contents of each of these applications is incorporated by reference herein in its entirety.

FIELD OF THE INVENTION

The invention relates to personal-transportation vehicles such as power chairs, motorized wheelchairs, and scooters. More particularly, the invention relates to a system that facilitates automatic transfer of a personal-transportation vehicle from a stored position on a motor vehicle, to another position proximate the motor vehicle that permits a mobility-impaired user to transfer between the motor vehicle and the personal-transportation vehicle.

BACKGROUND OF THE INVENTION

Personal-transportation vehicles are commonly used by persons with ambulatory difficulties or other disabilities. Personal-transportation vehicles are often transported using a motor vehicle such as a van, pickup truck, passenger car, etc. (hereinafter referred to as a σtransporting vehicleμ).

Lift and carrier assemblies have been developed for lifting personal-transportation vehicles onto and off of transporting vehicles, and for storing the personal-transportation vehicle on the transporting vehicle. A lift and carrier assembly can be configured to store the personal-transportation vehicle in a position external to the transporting vehicle. Alternatively, a lift and carrier assembly can be configured to retract into the transporting vehicle, thereby permitting the personal-transportation vehicle to be transported while located inside of the transporting vehicle.

Retrieving the personal-transportation vehicle from the lift and carrier assembly can present difficulties for a mobility-impaired user. More particularly, it may be difficult or impossible for a mobility-impaired user to move from the driver s position (or some other location) in the transporting vehicle to the lift and carrier assembly, to retrieve the personal-transportation vehicle. It may also be difficult or impossible for the user to move from the lift and carrier assembly to the driver s position (or some other location), after the personal transportation vehicle has been stored on the lift and carrier assembly. Hence, a mobility-impaired user may be unable to travel in the transporting vehicle when assistance to load and unload the user s personal transportation vehicle is unavailable to the user at the origin or destination of the trip.

Consequently, a need exists for a system that allows a mobility-impaired user to store and retrieve a personal-transportation vehicle on a motor vehicle with minimal physical effort and movement required on the part of the user.

SUMMARY OF THE INVENTION

The present invention provides a system for automatically transferring a personal-transportation vehicle, such as a power chair, between a first and a second position proximate a motor vehicle such as a minivan. The system can be used to transfer the personal-transportation vehicle between a first position on a lift and carrier assembly mounted on the motor vehicle, and a second position proximate a door of the motor vehicle, so that the user can transfer to and from the personal-transportation vehicle with minimal physical effort and movement. The system can generate guidance information for the personal-transportation vehicle based on position information generated by sensors located on one or both of the personal-transportation vehicle and the motor vehicle.

Preferred embodiments of a system for storing and retrieving a personal-transportation vehicle comprise a lift and carrier assembly capable of being mounted on a motor vehicle and comprising a platform for supporting the personal-transportation vehicle on the motor vehicle, and means for providing an indication of a position of the personal-transportation vehicle in relation to the motor vehicle.

The system also comprises means for guiding the personal-transportation vehicle between a first position on the platform of lift and carrier assembly, and a second position proximate a seat of the motor vehicle based on the indication of a position of the personal-transportation vehicle in relation to the motor vehicle.

Preferred embodiments of a system for guiding a personal-transportation vehicle between a first and a second position proximate a motor vehicle comprise a vision system capable of being mounted on the motor vehicle and comprising a camera and a processor communicatively coupled to the processor, for generating information representing a visual image of the personal-transportation vehicle. The system also comprises a first computing device communicatively coupled to the vision system for generating guidance information for the personal-transportation vehicle based on the information representing a visual image of the personal-transportation vehicle.

The system further comprises a proximity sensor capable of being mounted on the personal-transportation vehicle for generating information relating to a distance between the personal-transportation vehicle and the motor vehicle, and a second computing device communicatively coupled to the proximity sensor for generating guidance information for the power chair based on the information relating to a distance between the personal-transportation vehicle and the motor vehicle.

Other preferred embodiments of a system for guiding a personal-transportation vehicle between a first and a second position proximate a motor vehicle comprise a proximity sensor capable of being mounted on the personal-transportation vehicle, a vision system capable of being mounted on the motor vehicle and comprising a camera and a processor communicatively coupled to the camera, and a computing device communicatively coupled to the proximity sensor and the vision system for providing guidance information to the personal-transportation vehicle based on inputs from the proximity sensor and the vision system.

Other preferred embodiments of a system for storing and retrieving a personal-transportation vehicle comprise a lift and carrier assembly capable of being mounted on the motor vehicle so that the lift and carrier assembly can lift and lower the personal-transportation vehicle and support the personal-transportation vehicle on the motor vehicle. The system also comprises a laser rangefinder for generating information relating to a distance between the personal-transportation vehicle and the motor vehicle, and a vision system comprising a camera and a processor communicatively coupled to the camera, for generating information corresponding to a visual image of the personal transportation vehicle.

The system further comprises at least one computing device for guiding the personal-transportation vehicle along a predetermined course between the lift and carrier assembly and a seat of the motor vehicle based on the information relating to a distance between the personal-transportation vehicle and the motor vehicle and the information corresponding to a visual image of the personal transportation vehicle.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DETAILED DESCRIPTION OF ILLUSTRATIVE EMBODIMENTS

Figure 1:
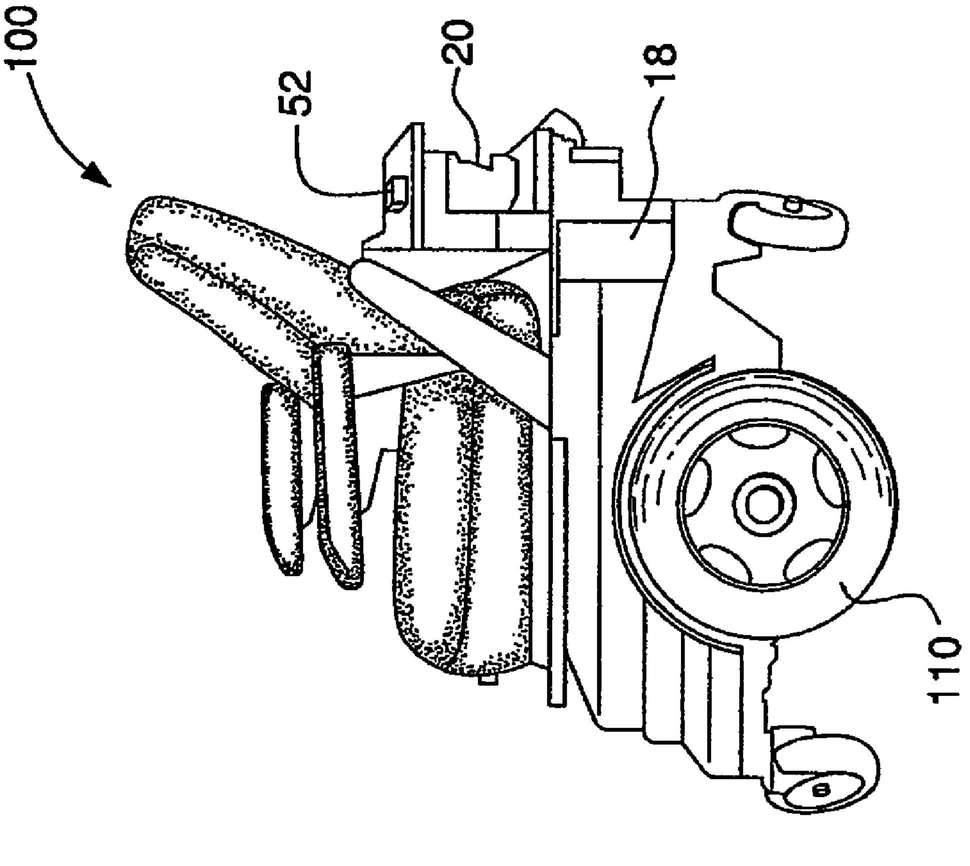
FIG. 1 is a side view of a power chair incorporating components of a preferred embodiment of a system for storing and retrieving a personal-transportation vehicle.
Figure 2:
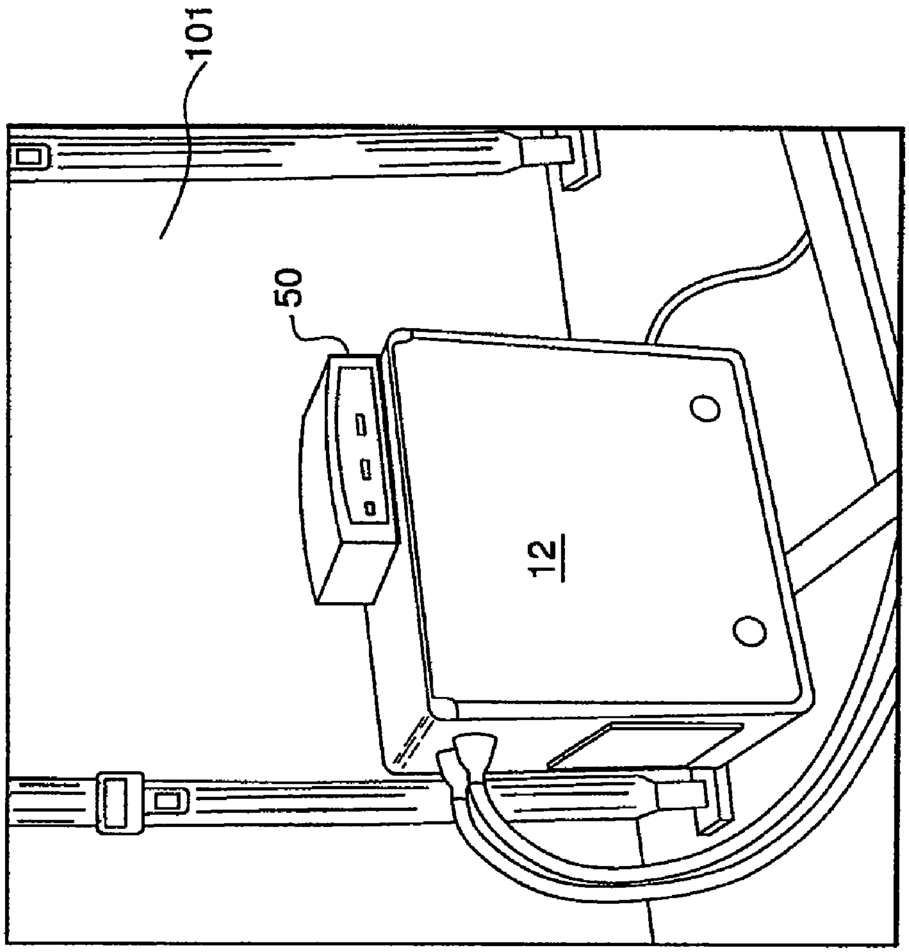
FIG. 2 is a perspective view of a computing device and a wireless bridge of the system shown in FIG. 1, installed in a minivan.

FIGS. 1-3 and 5-27 depict a preferred embodiment of a system 10 for automatically storing and retrieving a personal-transportation vehicle. The system 10 is described herein in connection with a personal-transportation vehicle in the form of a power chair 100, and a motor vehicle in the form of a minivan 101.

The system 10 can be used to facilitate movement of the power chair 100 between a first position on a lift and carrier assembly 104 mounted on the minivan 101, and a second position proximate a side door 103 of the minivan 101. (The power chair is depicted in the first and second positions in FIGS. 16A and 21A, respectively.) The driver of the minivan 101 can transfer between the power chair 100, and a specially-configured driver s seat when the power chair 100 is in the second position. The system 10 can thus permit a mobility-impaired user to remotely store and retrieve the power chair 100 without assistance from another individual.

This use of the system 10 to facilitate movement of the power chair 100 to a position proximate the side door 103 of the minivan 101, so that the driver can enter and exit the minivan 101, is disclosed for exemplary purposes only. The system 10 can be configured to move the power chair 100 to positions proximate other locations in the minivan 101, to facilitate the entry and exit of passengers (instead of the driver).

The use of the system 10 in connection with a power chair 100 and a minivan 101 is disclosed for exemplary purposes only. The system 10 can be used in connection with other types of personal-transportation vehicles, such as motorized wheelchairs, scooters, etc. Moreover, the system 10 can be used with other types of motor vehicles, such as pickup trucks, full and medium-size vans, automobiles, etc.

The system 10 can be operated in different modes that provide varying degrees of automation in the transfer of the power chair 100. For example, the system 10 can facilitate fully automated transfer of the power chair 100 between the first and second positions. In other words, the system 10 can allow the user to initiate transfer of the power chair 100 without a need for any action other than activating the system 10. Automated transfer, as discussed below, can be facilitated by a combination of image-based control (σvision modeμ), and control based on range and displacement measurements obtained by instrumentation mounted on the power chair 100 (σchair modeμ).

Alternatively, transfer of the power chair 100 can be performed using a joystick mounted in the minivan 101. In particular, the user can guide the power chair 100 between the first and second positions by manipulating a joystick within reach of the user when the user is seated within the minivan 101.

The power chair 100 can also be transferred on a manual basis, i.e., by driving the power chair 100 in the normal manner between the first and second positions.

Figure 3:
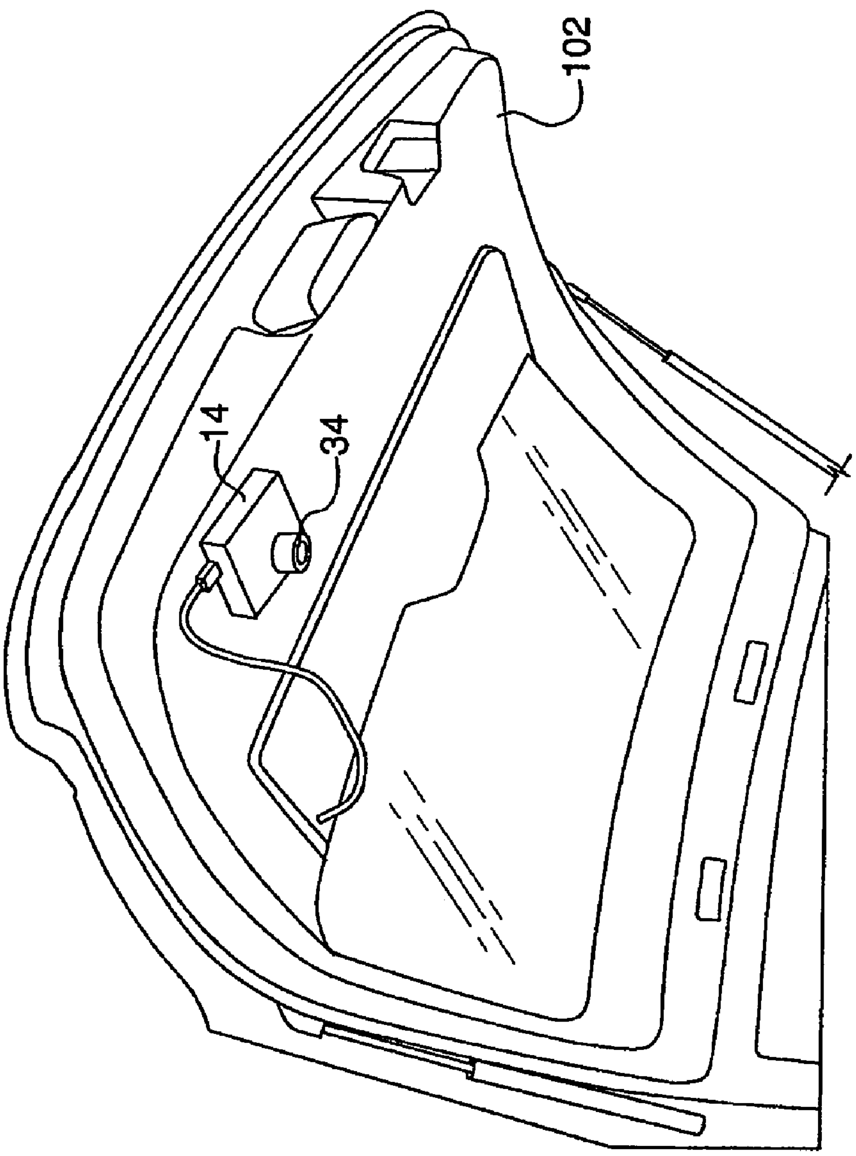
FIG. 3 is a perspective view of a vision system of the system shown in FIGS. 1 and 2, installed on a liftgate of the minivan shown in FIG. 2, with the liftgate in its raised, or open position.

The system 10 comprises a first computing device 12, a vision system 14 communicatively coupled to the first computing device 12, and a wireless communication system 16 (see, for example, FIGS. 1-5, 7A, and 7B). The first computing device 12 and the vision system 14 are preferably mounted on the minivan 101, as shown in FIG. 3.

The vision system 14, as discussed below, generates a digital output corresponding to the image within the field of view of the vision system 14 (the field of view of the vision system 14 is denoted by the dashed line 70 in figures). The first computing device 12 uses this output to generate control inputs that guide the power chair 100 onto and off of the lift and carrier assembly 104. The control inputs are transmitted from the first computing device 12 to the power chair 100 by way of the wireless communication system 16.

Figure 7A:
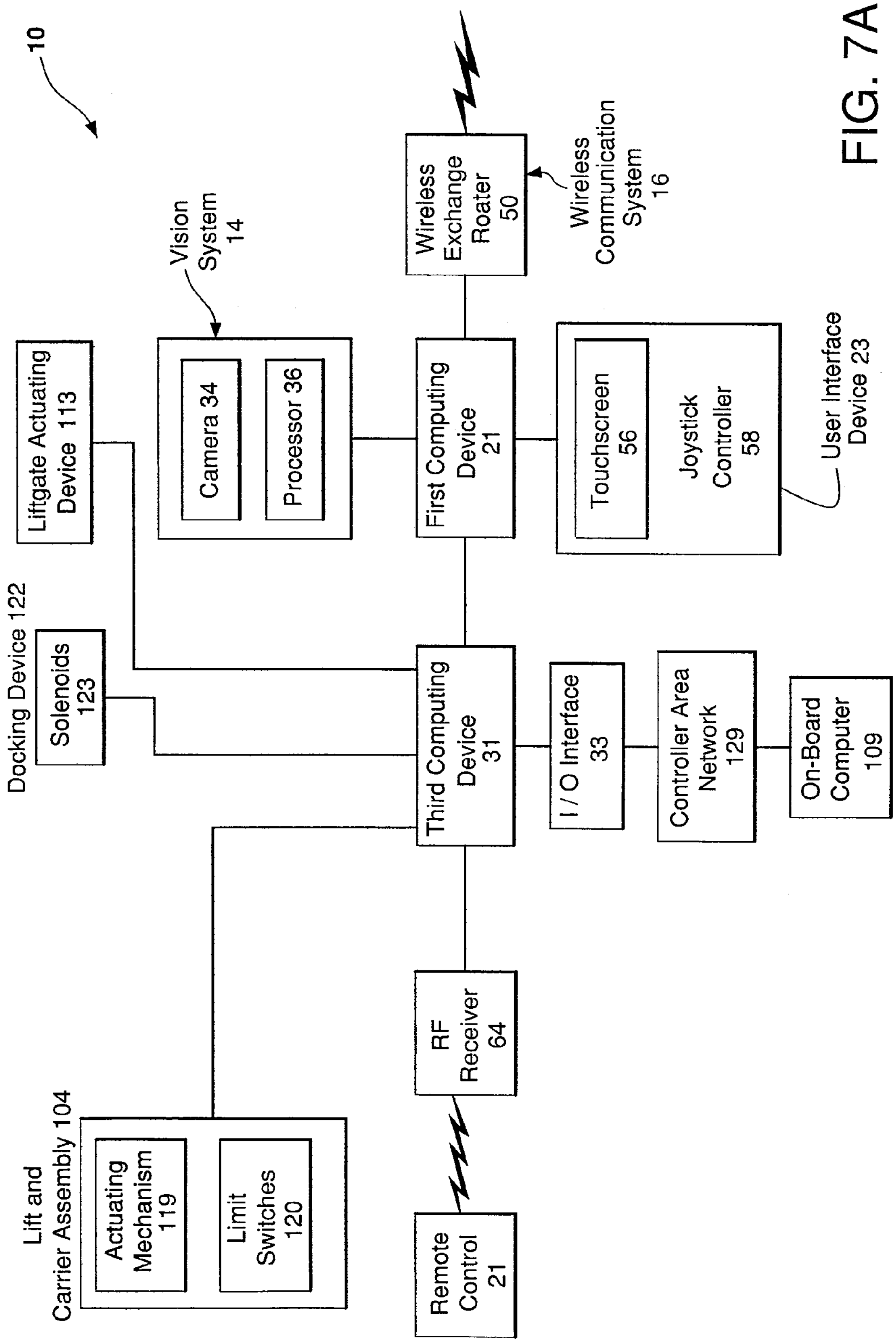
FIGS. 7A and 7B are block diagrams depicting the system shown in FIGS. 1-3, 5, and 6.
Figure 7B:
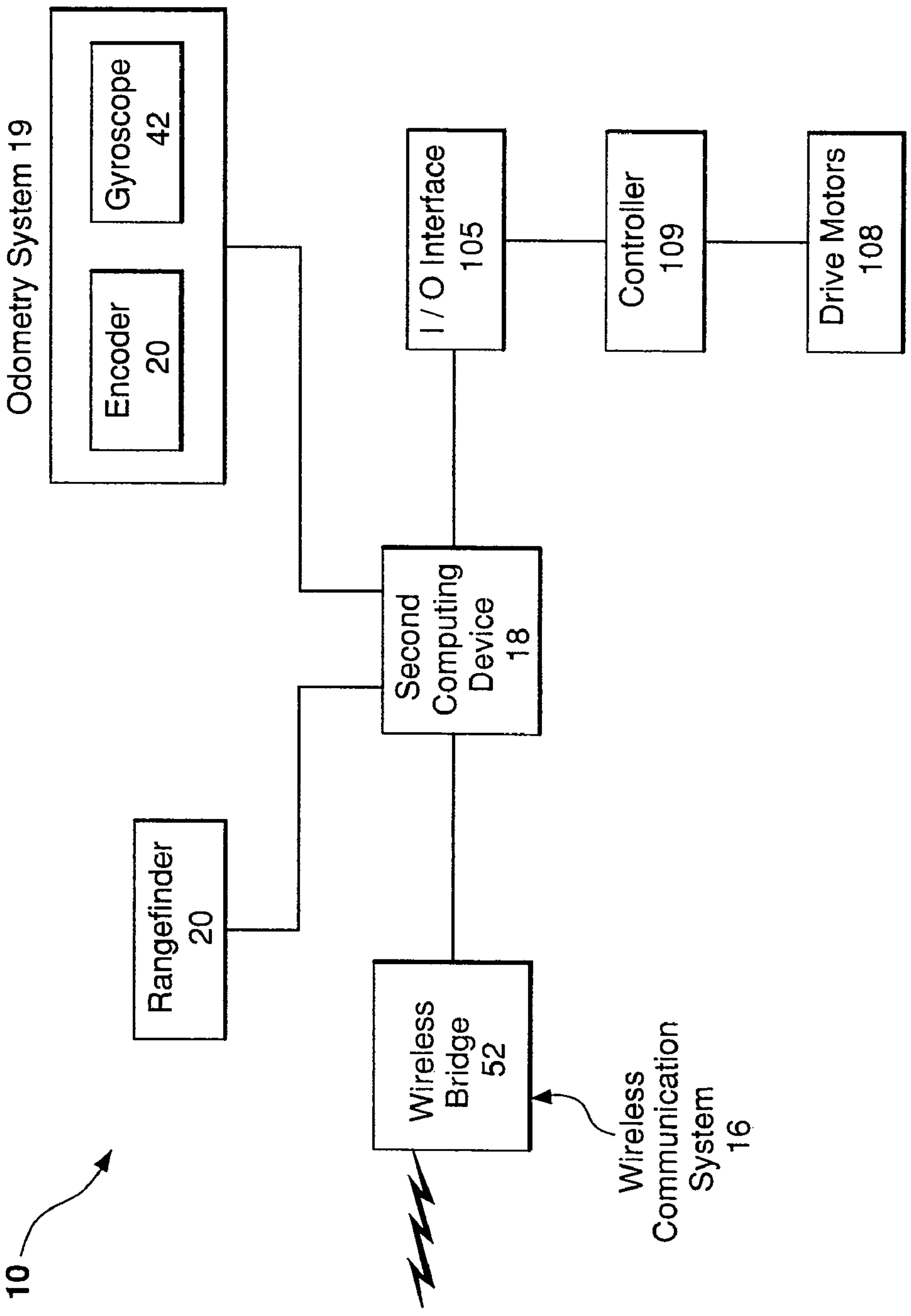

The system 10 also comprises a second computing device 18 (see FIGS. 1 and 7B). The second computing device 18 is communicatively coupled to the wireless communication system 16. The second computing device 18 is also communicatively coupled to a controller 109 of the power chair 100, by way of an input/output (I/O) interface 105 (see FIG. 7B).

Figure 9:
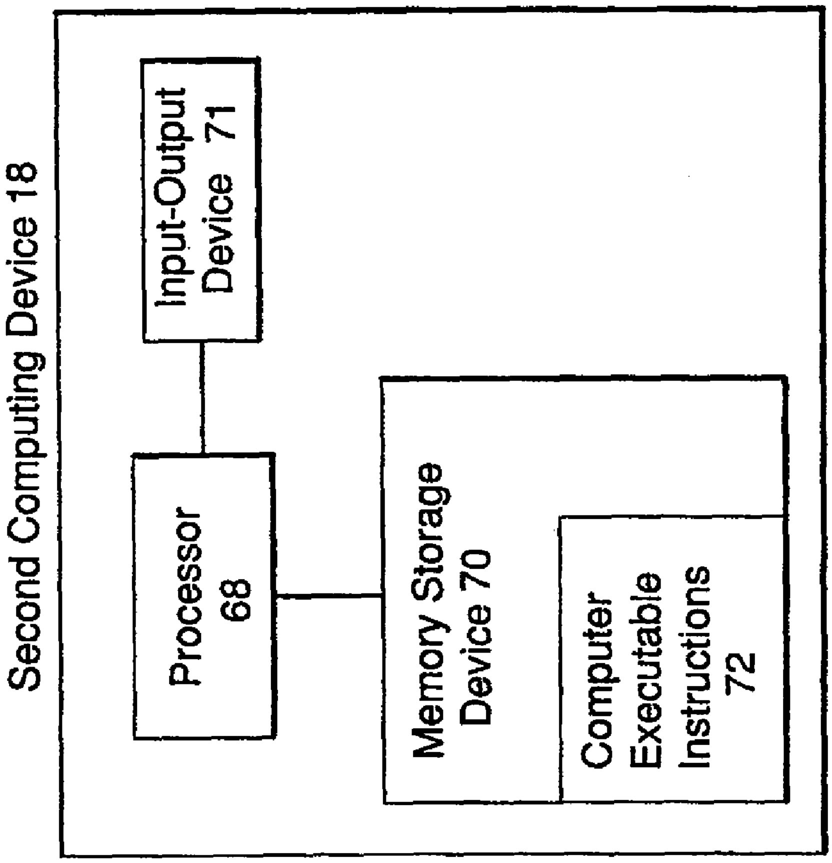
FIG. 9 is a block diagram of another computing device of the system shown in FIGS. 1-3 and 5-8.

The second computing device 18 can be formed, for example, from a stack of general-purpose PC104 cards with additional NREC custom interface cards. The second computing device 18 can include a processor 68, a memory-storage device 70 communicatively coupled to the processor 68, and a set of computer-executable instructions 72 stored on the memory-storage device 70, as shown in FIG. 9. The processor 68 can be, for example, a microprocessor. The second computing device 18 can also include an input-output device 71 communicatively coupled to the processor 68.

The second computing device 18 can include, for example, an EBC 363 1-GHz Processor Embedded Controller available from NEXCOM International Co., Ltd.; a 512 MB PC133 SODIMM memory module available from Crucial Technologies; a COMPACT FLASH™ 2-GB compact flash card available from Transcend Online Store; an HESC104 power supply available from Tri-M Engineering and Systems Inc.; a 4I30 four-channel quadrature counter card available from Mesa electronics; and a Diamond-MM 12-bit Analog I/O PC/104 Module available from Diamond Systems Corp. The use of this particular hardware in connection with the second computing device 18 is specified for exemplary purposes only. Other types of hardware can be used in the alternative.

The power chair 100 includes two drive motors 108 communicatively coupled to the second computing device 18, as shown in FIG. 7B. (The controller 109 and the motors 108 can be the original equipment manufacturer (OEM) controller and drive motors of the power chair 100.)

Each drive motor 108 turns an associated drive wheel 110 of the power chair 100. The drive motors 108 can be actuated simultaneously, to cause the power chair 100 to translate linearly. The drive motors 108 can also be activated individually, i.e., one at a time, to steer the power chair 100 by differential steering.

The second computing device 18 receives the control inputs generated by the first computing device 12, by way of the wireless communication system 16. The second computing device 18, in response, generates outputs that, when received by the controller 109, cause the controller 109 to activate the drive motors 108 in a manner that causes the power chair 100 to translate in a desired direction.

The system 10 also comprises an odometry system 19, and a proximity sensor in the form of a laser rangefinder 20. The odometry system 19 and the rangefinder 20 are communicatively coupled to the second computing device 18, as shown in FIG. 7B. The second computing device 18 and the rangefinder 20 are preferably mounted on the power chair 100. The use of a laser rangefinder 20 as the proximity sensor of the system 10 is specified for exemplary purposes only. Other types of proximity sensors can be used in the alternative.

The second computing device 18, as discussed below, receives positional information from the odometry system 19 and the rangefinder 20 when the translation of the power chair is being controlled in the chair mode. The second computing device 18 can generate responsive outputs that, when received by the controller 109 of the power chair 100, cause the power chair 100 to translate in a desired direction.

The controller 109 can control the operation of drive motors 108 in a conventional manner when the system 10 is not being used to guide the power chair 100. In other words, the controller 109 can respond to inputs provided by the rider of the power chair 100 via a joystick controller or other input device of the power chair 100, when the system 10 is not providing guidance information via the second computing device 18.

The second computing device 18 can be communicatively coupled directly to the drive motors 108 in alternative embodiments of the system 10. In other words, the second computing device 18 can directly control the operation of the drive motors 108 and the steering motors 110, without the use of the controller 109. (The controller 109 can be used to control the drive motors 108 and steering motors 110 in a conventional manner when the system 10 is not providing guidance information via the second computing device 18.)

Figure 4:
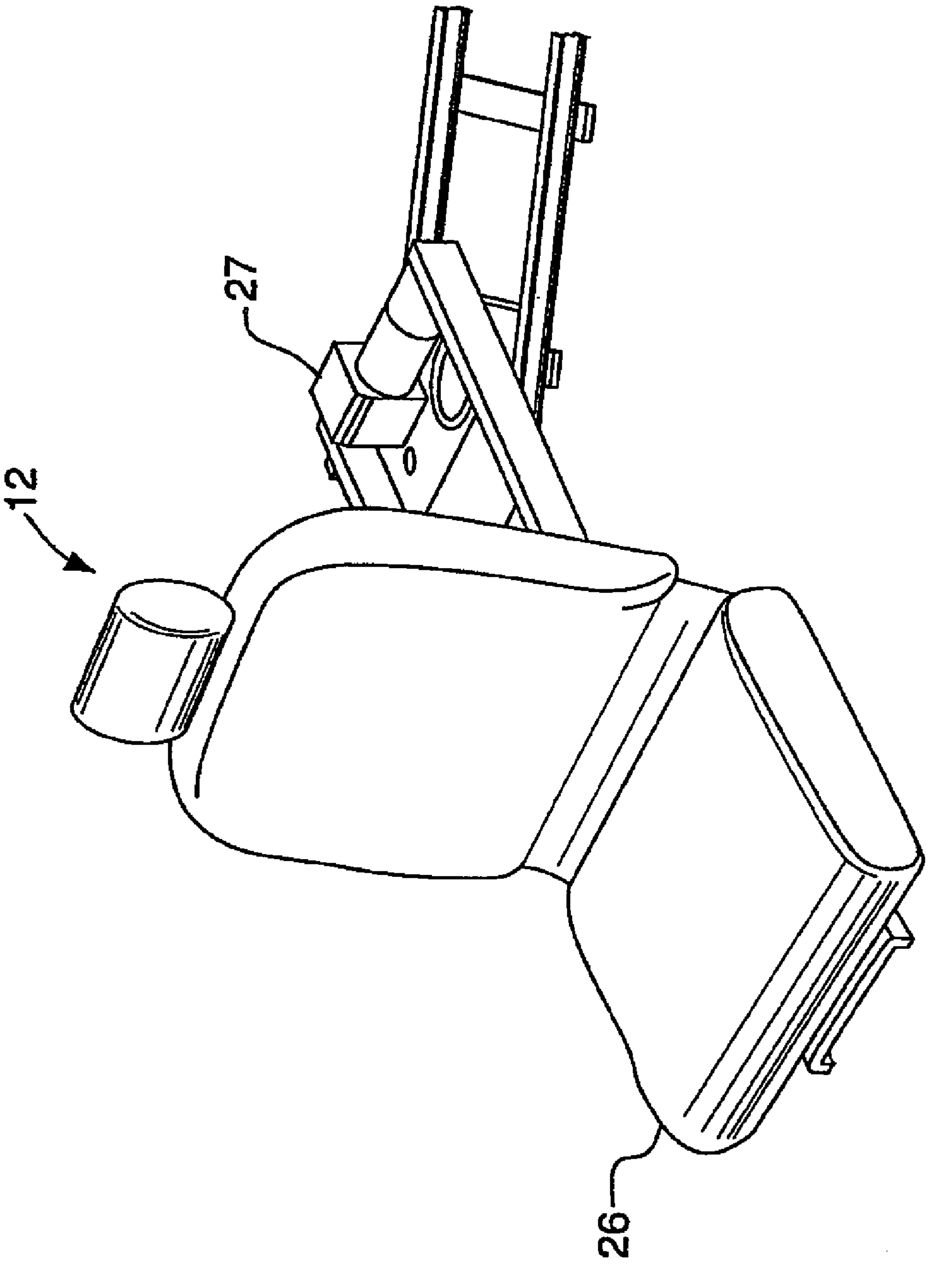
FIG. 4 is perspective view of a seat system suitable for use with the system shown in FIGS. 1-3.
Figure 23A:
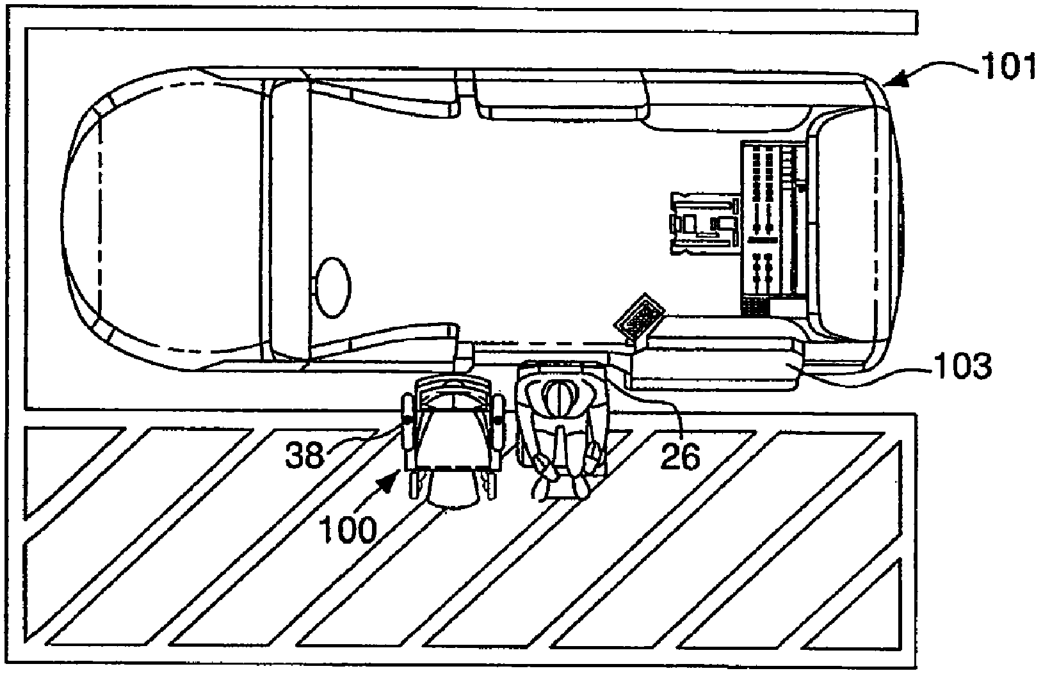

The system 10 can be used in connection with a seat system 17 (see FIG. 4). The seat system 17 can be used in lieu of the OEM driver s seat in the minivan 101. The seat system 17 comprises a seat 26. The seat system 17 also comprises an actuating mechanism 27 that moves the seat 26 between a first position (FIG. 11A) and a second position (FIG. 23A). The seat 26, when in the first position, places the user in a position suitable for operating the minivan 101. In other words, the position of the seat 26 when in the first position is substantially identical to the position of the OEM driver s seat.

The actuating mechanism 27 moves the seat 26 rearward from its first position, turns the seat 26, extends the seat through the passenger door 103 of the minivan 101, and then lowers the seat 26 into its second position (see FIGS. 11A-23B). The seat 26, when disposed in its second position, places the user in a position suitable for transferring the user to the power chair 100. Seat systems that employ features suitable for use in the seat system 17 are available, for example, from Bruno Independent Living Aids of Oconomowoc, Wis.; Americhair Corporation of Sunny Isles Beach, Fla.; and General Motors Corporation.

Figure 5:
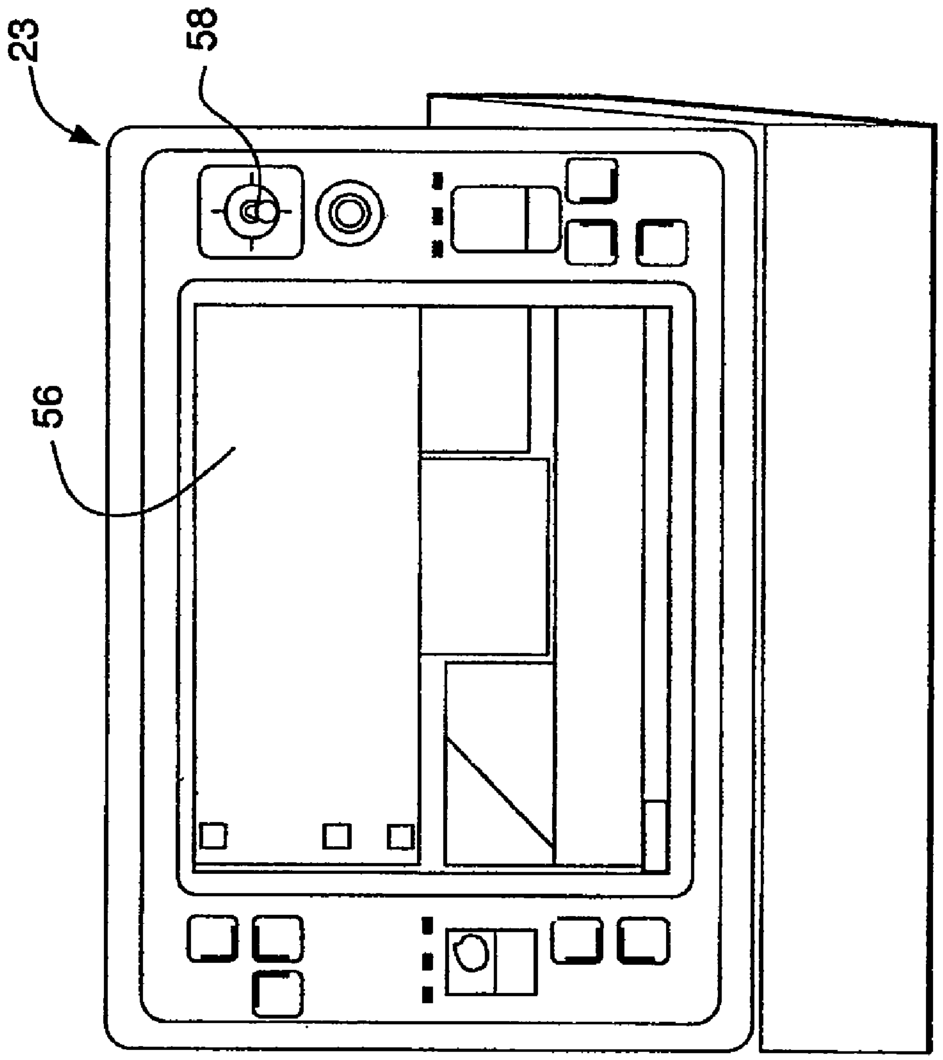
FIG. 5 is a perspective view of a user interface device of the system shown in FIGS. 1-3.
Figure 14A:
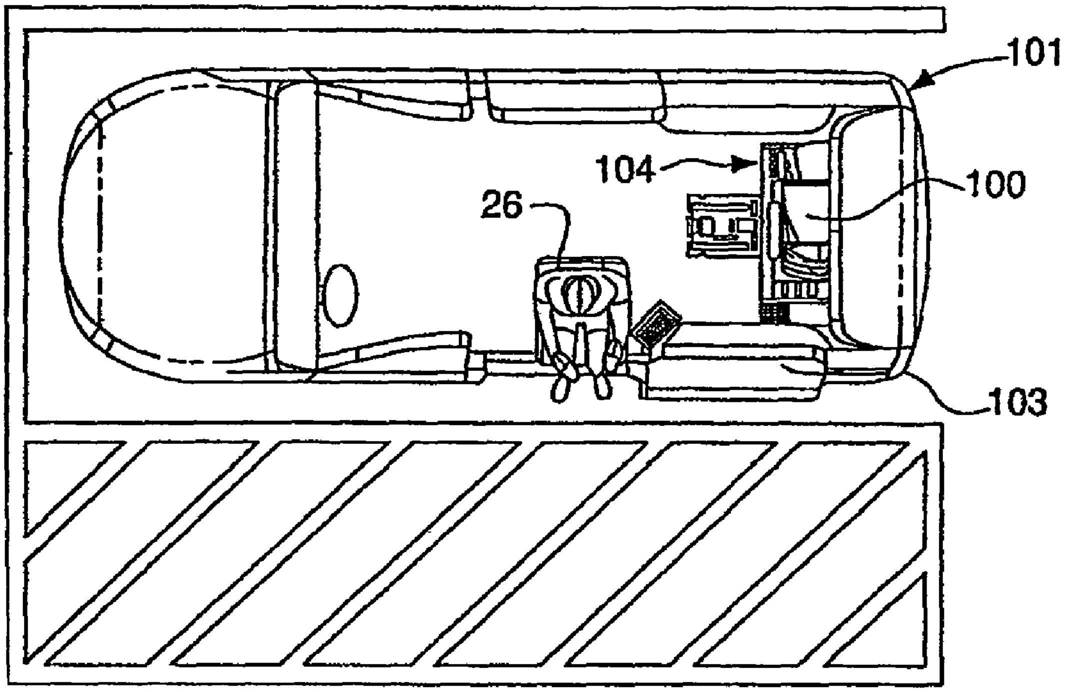

The system 10 further comprises a user interface device 23, as shown in FIG. 5. The user interface device 23 is communicatively coupled to the first computing device 12 by, for example, wired connections. The user interface device 23 can be mounted on a B pillar 106 adjacent the side door 103 of the minivan 101, or at another location accessible to the user when the seat 26 is positioned as depicted in FIG. 14A. The user interface device 23 accepts inputs from the user to activate the various functions the system 10, and can display status and other information concerning the system 10.

For example, the user interface device 23 can include a touchscreen 56 that facilitates user inputs to the system 10, as shown in FIG. 5. The user interface device 23 can be configured so that the touchscreen 56 can display the image generated by the vision system 14, in real-time.

The user interface device 23 can include a joystick controller 58. The joystick controller 58 can facilitate user inputs to guide the power chair 100 when the system 10 is not being operated automatically, i.e., when the system 10 is not being operated in a combination of chair and vision modes.

Figure 8:
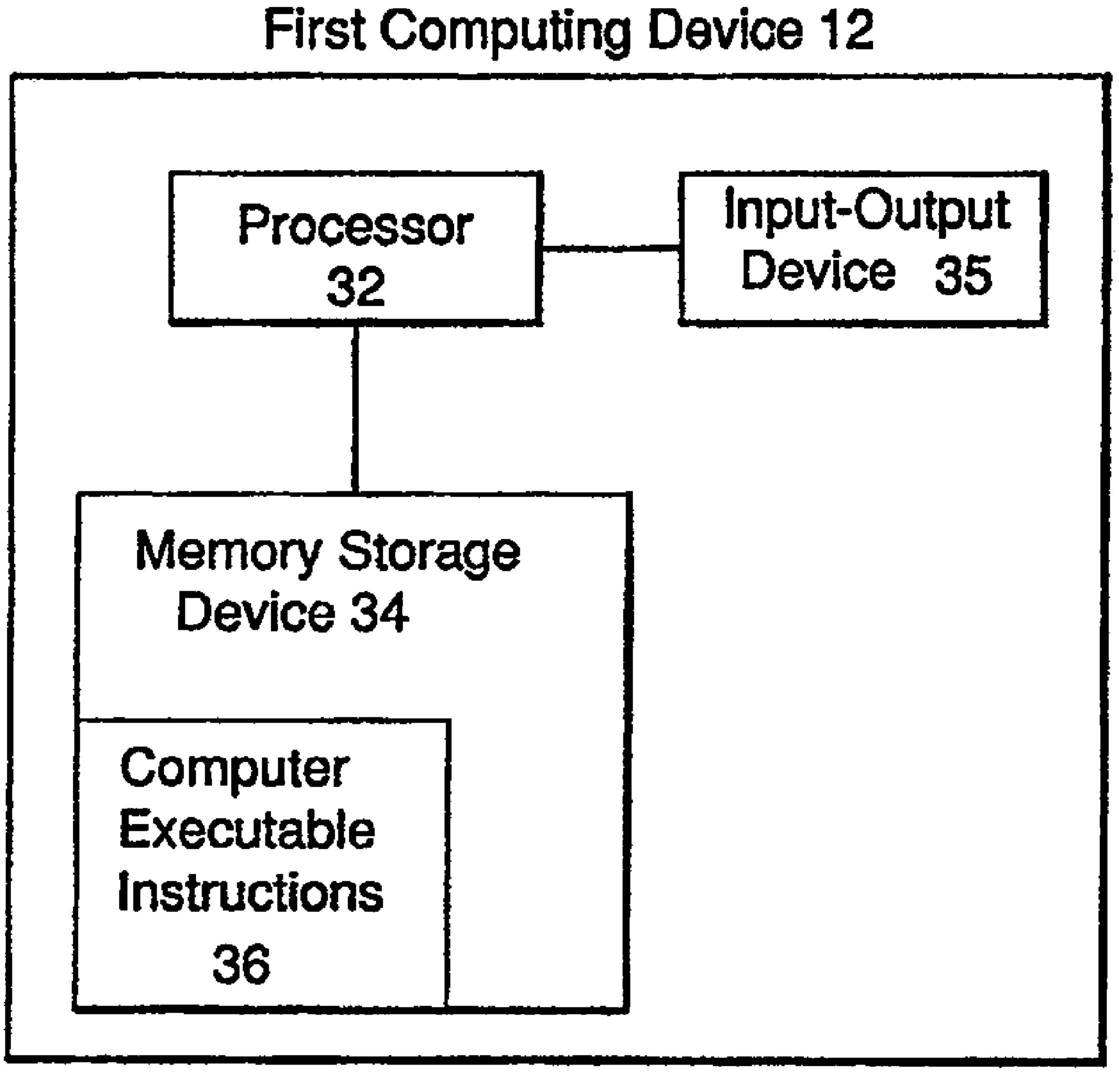
FIG. 8 is a block diagram of the computing device shown in FIG. 2.

The first computing device 12 can include a processor 32, a memory-storage device 34 communicatively coupled to the processor 32, and a set of computer-executable instructions 36 stored on the memory-storage device 34 (see FIG. 8). The processor 32 can be, for example, a microprocessor. The first computing device 18 can also include an input-output device 35 communicatively coupled to the processor 32.

A Sahara i213 iTablet tablet PC can be used as the first computing device 12. The use of this particular computing device is disclosed for exemplary purposes only. Other types of computing devices can be used in the alternative.

The vision system 14 can include a camera 34, and a processor 36 communicatively coupled to the camera 34 (see FIG. 7A). The camera 34 is preferably a monochromatic camera. More preferably, the camera 34 is an eight-bit, gray-field camera.

The vision system 14 generates a digital output representative of the image in the field of view 80 of the camera 34. The vision system 14 is preferably mounted at a location on the minivan 101 that places the lift and carrier assembly 104, and the ground-surface area immediately adjacent thereto, within the field of view 80. For example, the vision system 14 can be mounted on an inside of the liftgate 102 of the minivan 101, as shown in FIG. 3. The vision system 14 can include a suitable light source, such as a fifty-watt halogen light (not shown), to provide additional illumination within the field of view 80.

The optimal location for the vision system 14 can vary with the type of transporting vehicle in which the system 10 is being used. The vision system 14 is depicted at a particular location on minivan 101 for exemplary purposes only.

A suitable vision system can be obtained, for example, from Point Grey Research Inc., of Vancouver, BC, CANADA, as the DRAGONFLY™ camera.

The output of the processor 36 of the vision system 14 can be transmitted to the first computing device 12 by, for example, an IEEE 1394 standard σFirewireμ serial link, or other suitable means.

The first computing device 12 uses the output of the vision system 14 to track the pose, i.e., the orientation and position, of the power chair 100, in real time. In particular, the power chair 100 is equipped with fiducial markings 38 each having a predetermined visual pattern printed thereon (see FIGS. 17A, 18A, and 18B). The fiducial markings 38 can be, for example, decals. The fiducial markings 38 can have the visual pattern depicted in FIG. 18C printed thereon (other patterns can be used in the alternative). The fiducial markings 38 are positioned at predetermined locations on the power chair 100. For example, the fiducial markings 38 can be placed on the armrests of the power chair 100.

The first computing device 12 can be programmed to recognize the visual pattern on the fiducial markings 38. The first computing device 12 can be programmed to determine the pose of the power chair 100 based on the positions of the fiducial markings 38 within the field of view of the camera 34, and with reference to a Cartesian coordinate system referenced to a predetermined location within the field of view 80 of the vision system 14.

The first computing device 12 can be programmed to recognize the fiducial markings 38 using a two-dimensional pattern matching technique. More particularly, given an image I, an m×n fiducial pattern, or template T, and an m×n block region B∈I , the similarity of an image block B to the template T is calculated as $$\varepsilon(T,B)=\sum_{u=1}^{x}\sum_{v=1}^{y}\left[\frac{T(u,v)-\mu_T}{\sigma_T}-\frac{B(u,v)-\mu_B}{\sigma_B}\right]^2$$

where and denote the mean and standard deviation of the pixel intensity values for T and B. This is referred to as the normalized intensity distribution (NID), and models both changes in scene brightness and contrast. The fiducial position in the image is then determined from B*= arg min(ϵ) ∀B∈I. Depending on the size and resolution of the charge coupled devices (CCDs) used in the camera 34, it is believed that the positions of the fiducial markings 38 can be estimated with a resolution approximately 2 mm or greater.

The above technique for determining the positions of the fiducial markings 38 can be programmed into the first computing device 12 using programming techniques such as parallel instructions, separability of NID metric, and the statistical relationships of overlapping image blocks. These programming techniques, it is believed, can produce a speed advantage of one to two orders of magnitude over conventional programming techniques. Achieving this speed advantage can be particularly beneficial where the data processing budget is relatively limited, e.g., approximately 1.1 GHz.

The first computing device 12 can be programmed to include a feature tracker, to supplement the above-described pattern matching technique. The feature tracker can use, for example, a Harris corner detector. In particular, the first computing device 12 can compute the locally averaged moment matrix computed from the image gradients, and then combine the eigenvalues of the moment matrix to compute a corner σstrength, μ of which maximum values indicate the corner positions.

The parallel use of a pattern matching technique and a feature tracker can provide a consistency check that can be used in conjunction with binary filters based upon the pattern on the fiducial markings 38 and the geometry of the power chair 100, to eliminate false correspondences in the tracking of the position of the power chair 100.

Alternative embodiments of the system 10 can be configured to operate without the fiducial markings 38. For example, the second computing device 18 can be programmed to recognize unique physical features of the power chair 100, such as the radius of each armrest, in lieu of the fiducial markings 38.

A suitable rangefinder 20 can be obtained, for example, from SICK AG of Dusseldorf, Germany as the LMS200 or LMS100 rangefinder. The rangefinder 20 is mounted on the power chair 100 so that the rangefinder 20 can provide an indication of the spacing between the power chair 100, and the left side 112 of the minivan 101.

The rangefinder 20 generates a digital output representative of the distance, or range, between the rangefinder 20, and objects located within the field of view of rangefinder 20 (the field of view of the rangefinder 20 is denoted by the lines 82 in the figures). The range information generated by the rangefinder 20 can be used in conjunction with the translational information generated by the odometry system 19 to track the position of the power chair 100 as the power chair 100 translates between a third position proximate a left rear corner 114 of the minivan 101, and the second position proximate the side door 103. (The power chair is depicted in the third position in FIGS. 18A and 18B.) The range information can also be used to identify obstacles in the path of the power chair 100. (The left and right directions are referenced herein from a viewpoint aft of the minivan 101, looking forward.)

The odometry system 19 comprises two encoders 40 communicatively coupled to the second computing device 18 (see FIG. 7B). Each encoder 40 is mounted on an axle associated with one of the drive wheels 110 of the power chair 100, so that the encoder 40 is responsive to rotation of the corresponding axle of the drive wheel 110. The encoders 40 can each include, for example, an indexing wheel, or gear that rotates with the associated axle, and a Hall Effect sensor that generates an electrical output, or pulse, in response to the rotation of the indexing wheel. The pulse count is proportional to the angular displacement of the axle (and the attached drive wheel 110).

The second computing device 18 is programmed to convert the pulse count from each encoder 40 into a linear distance over which the associated drive wheel 110 has traveled, based on the diameter of the drive wheels 110. The output of the encoders 40 can thus be used to determine the linear displacement of the power chair 100 along the ground surface.

The encoders 40 are preferably full-quadrature encoders. Suitable encoders 40 can be obtained, for example, from Sensor Solutions Corp. of Steamboat Springs, Colo., as the model no. A63-37ADQ-QCSA5 quadrature speed sensor. The use of the decoders 40 is disclosed for exemplary purposes only. Other devices capable of measuring the angular or linear displacement of the drive wheels 110 can be used in the alternative.

The odometry system 19 can also include a gyroscope 42 communicatively coupled to the second computing device 18. The gyroscope 42 can provide information relating to the orientation of the power chair 100 (see FIG. 7B). This information can be used by the second computing device 18 to determine whether one of the drive wheels 110 is slipping while being rotated by the associated drive motor 108.

For example, slippage of one, but not the other of the drive wheels 110 will generally cause the power chair 100 to turn toward the side of the power chair 100 on which the slipping drive wheel 110 is located. The gyroscope 42 can provide the second computing device 18 with an indication that the power chair 100 is turning. The second computing device 18, upon detecting uncommanded turning of the power chair 110, can be programmed to turn the power chair 100 in the opposite direction, to straighten the power chair 100.

The orientation information provided by the gyroscope 42 can also be used to confirm that the power chair 100 is turning in response commands issued by the second computing device 18.

The gyroscope 42 can be, for example, a three-axis micro electrical mechanical systems (MEMS) gyroscope. The use of this particular type of gyroscope is disclosed for exemplary purposes only. Other types of gyroscopes, including single-axis gyroscopes, can be used in the alternative. A suitable gyroscope 42 can be obtained, for example, from Xsens Technologies B.V., of Enschede, the Netherlands, as the as the model no. MT9-B-28A23G35 inertial measurement unit.

The wireless communication system 16 can comprise a wireless Ethernet router 50 mounted at a suitable location on the minivan 101 and communicatively coupled to the first computing device 12. The wireless communication system 16 can also comprise a wireless bridge 52 mounted at a suitable location on the power chair 100 and communicatively coupled to the second computing device 18 (see FIGS. 1, 2, 7A, and 7B).

The wireless Ethernet router 50 and the wireless bridge 52 can be, for example, an 802.11g wireless Ethernet router and an 802.11g wireless bridge that facilitate wireless communications over a local Ethernet network, using a UDP over IP protocol. A wireless Ethernet router and a wireless bridge suitable for use as the wireless Ethernet router 50 and the wireless bridge 52 can be obtained, for example, from Linksys, of Irvine, Calif. as the model no. WCG200 Wireless-B Cable Gateway, and the model no. WET11 Wireless-B Ethernet Bridge. The use of this particular type hardware and protocol for the wireless communication system 16 is specified for exemplary purposes only. Other types of hardware, such as RF transceivers, and other types of protocols can be used in the alternative.

Figure 20A:
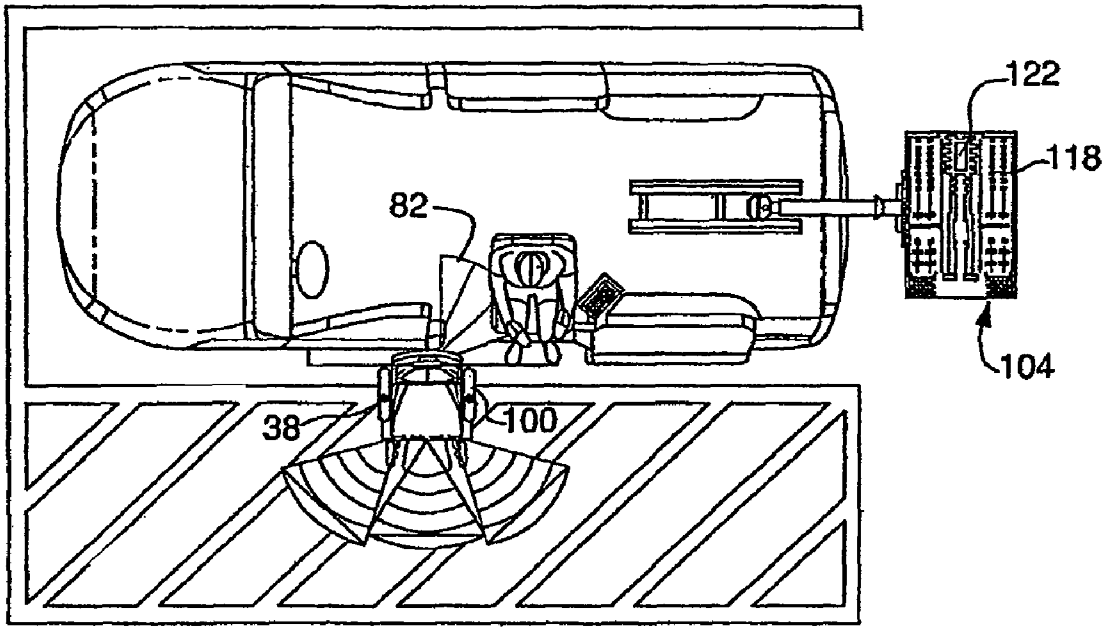
Figure 20B:
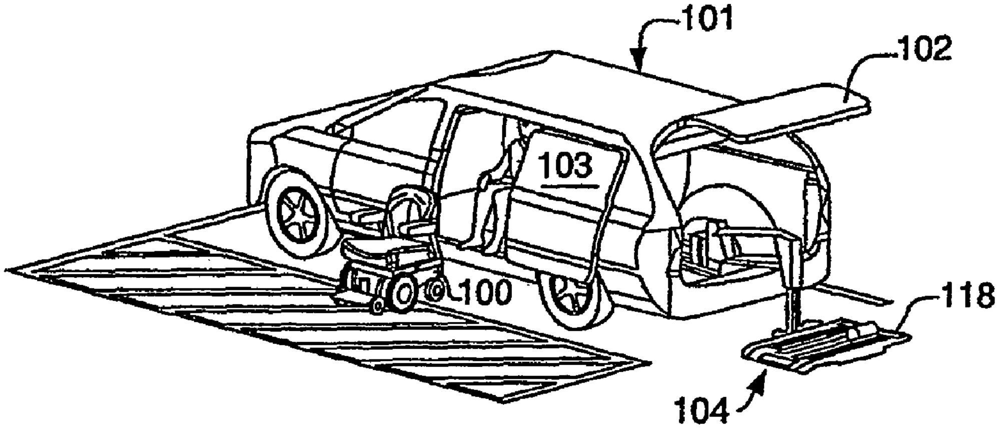
Figure 21A:
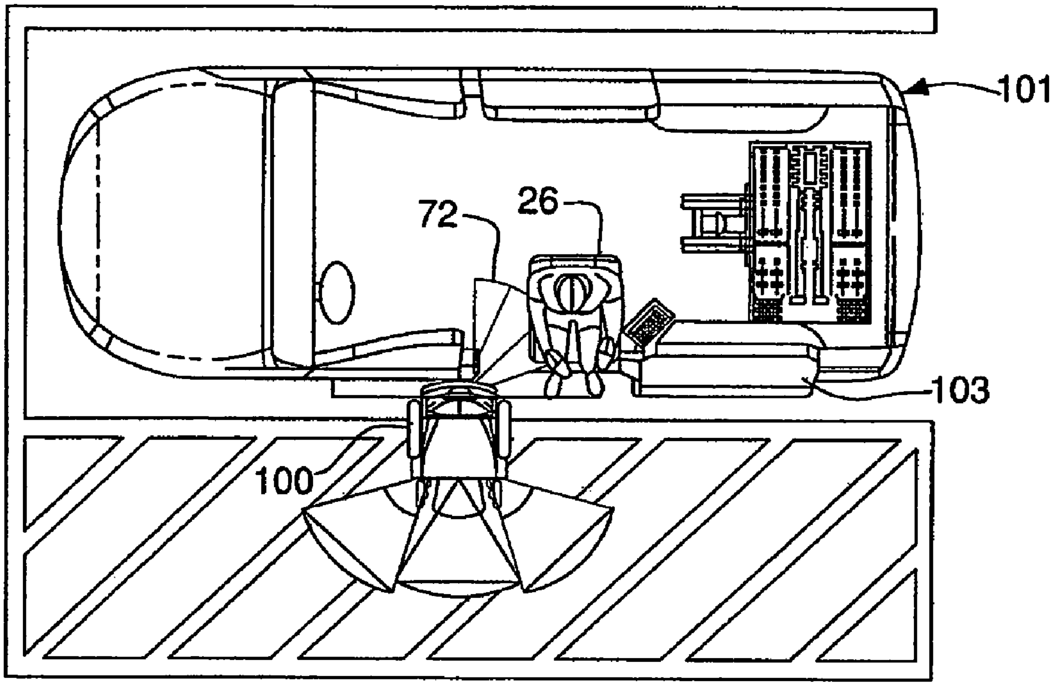
Figure 21B:
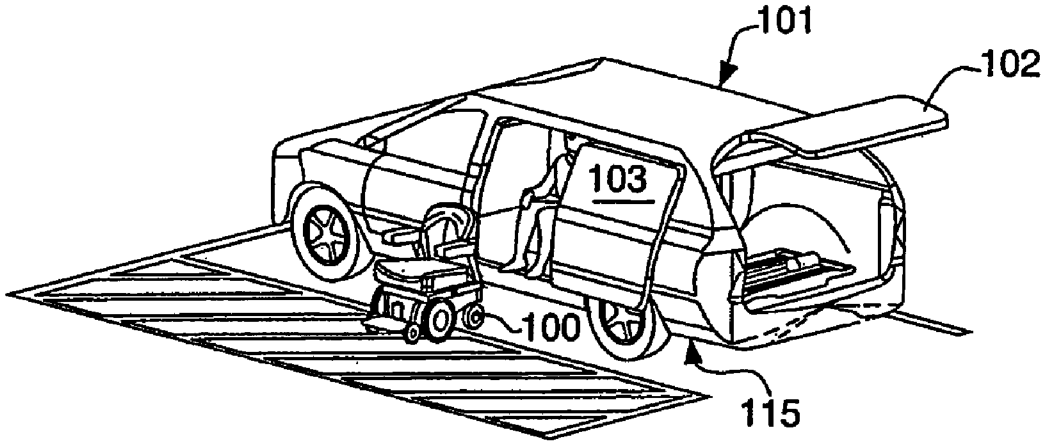
Figure 22A:
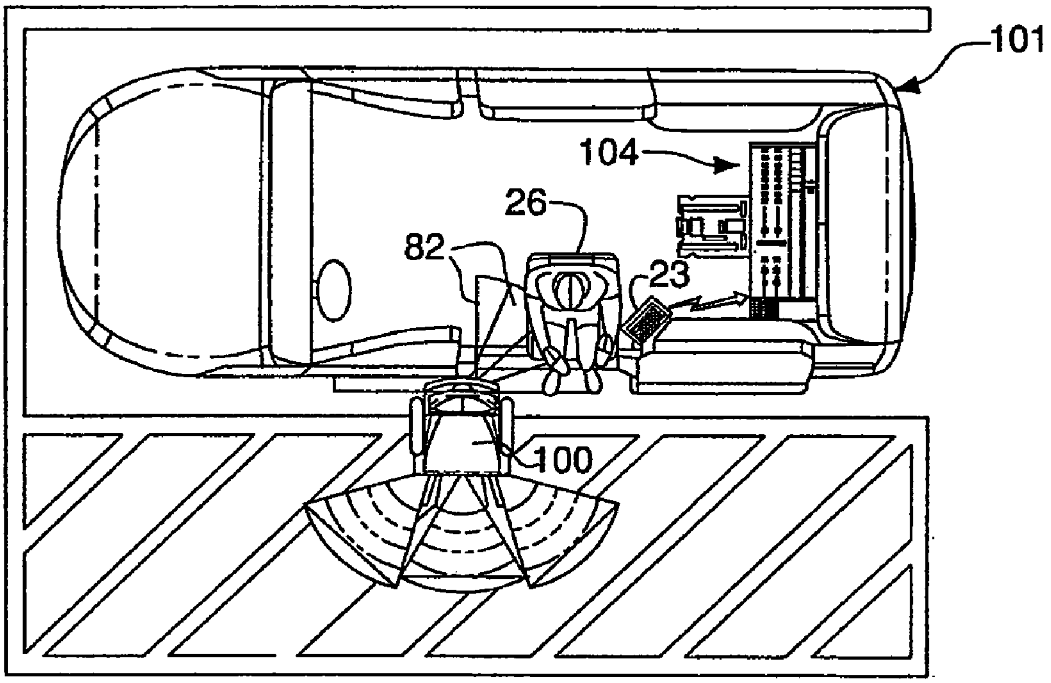
Figure 22B:
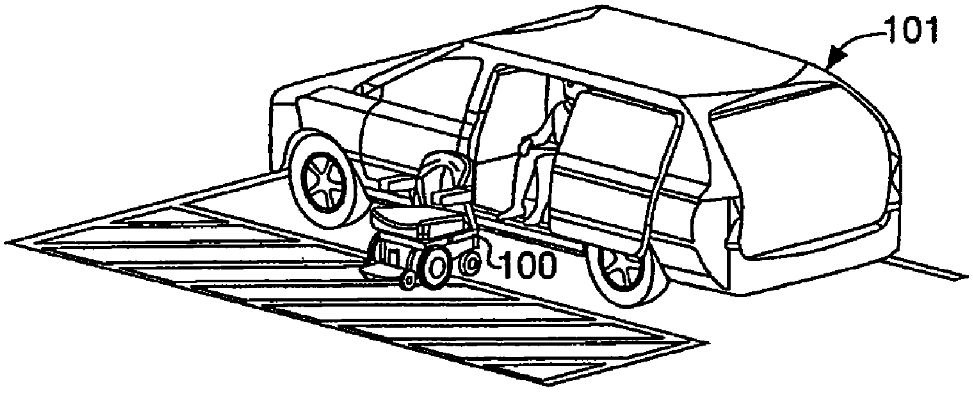

The lift and carrier assembly 104 can move between a retracted position (FIGS. 21A, 21B), and an extended position (FIG. 20A, 20B). The lift and carrier assembly 104 includes a platform 118 that holds the power chair 100. The lift and carrier assembly 104 includes an electrically-operated actuating mechanism 119 that can lift the platform 118 and the power chair 100 into the minivan 101 by way of the rear hatch of the minivan 101 (see FIG. 7A).

The actuating mechanism 119 can extend the platform 118 from the minivan 101, and lower the platform 118 onto the ground so that the power chair 100 can be driven onto an off of the platform 118. The lift and carrier assembly 104 can include one or more limit switches 120 that provide an indication to the actuating mechanism 119 that the platform 118 is on the ground surface (see FIGS. 7A and 16C).

The lift and carrier assembly 104 can be, for example, a TRACKER™ inside lift, available from Freedom Lift Corp. of Green Lane, Pa. The use of a lift and carrier assembly that stores the power chair 100 inside the minivan 101 is disclosed for exemplary purposes only. Lift and carrier assemblies that store the power chair 100 external to the minivan 101 can be used in the alternative; such a lift is available, for example, from Freedom Lift Corp. as the PATRIOT™ power chair lift.

The use of the TRACKER™ and PATRIOT™ lift and carrier assemblies is disclosed for illustrative purposes only; other types of lift and carrier assemblies can be used in the alternative.

Further details of lift and carrier assemblies suitable for use as part of the system 10 are included in U.S. Pat. No. 6,692,215, which claims priority to U.S. provisional application No. 60/278,621, filed Mar. 26, 2001; U.S. Pat. No. 7,396,202, which claims priority to U.S. provisional application No. 60/475,308 filed Jun. 3, 2003; and U.S. application Ser. No. 11/177,128, filed Jul. 8, 2005. The contents of each of these documents is incorporated by reference herein in its entirety.

Figure 18A:
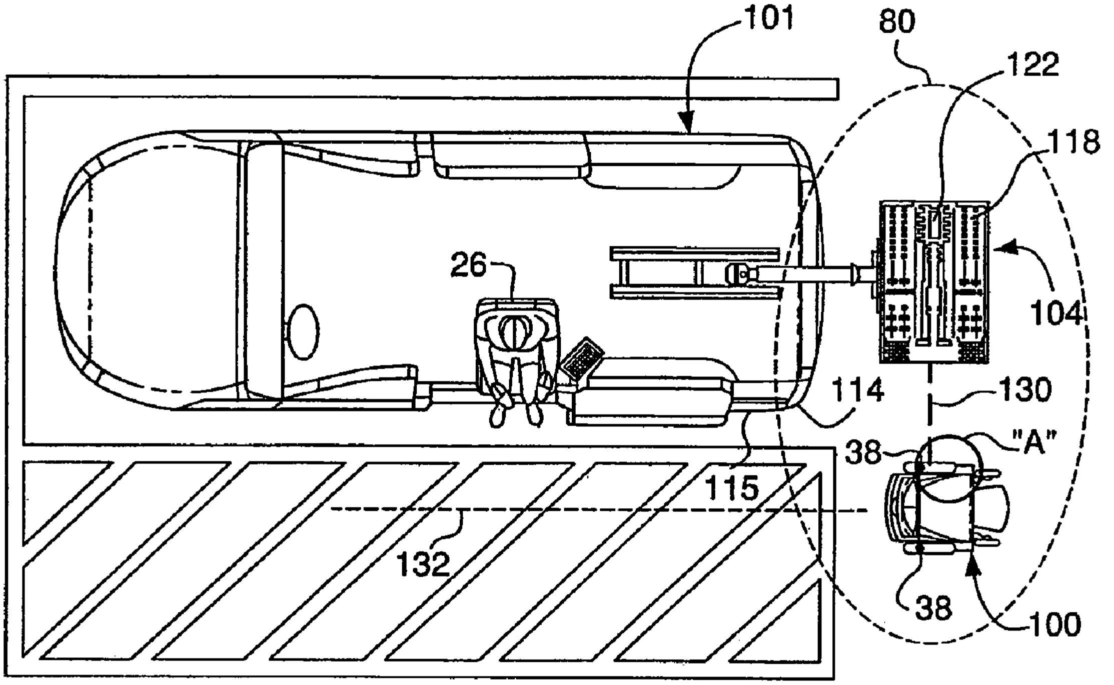
Figure 18B:
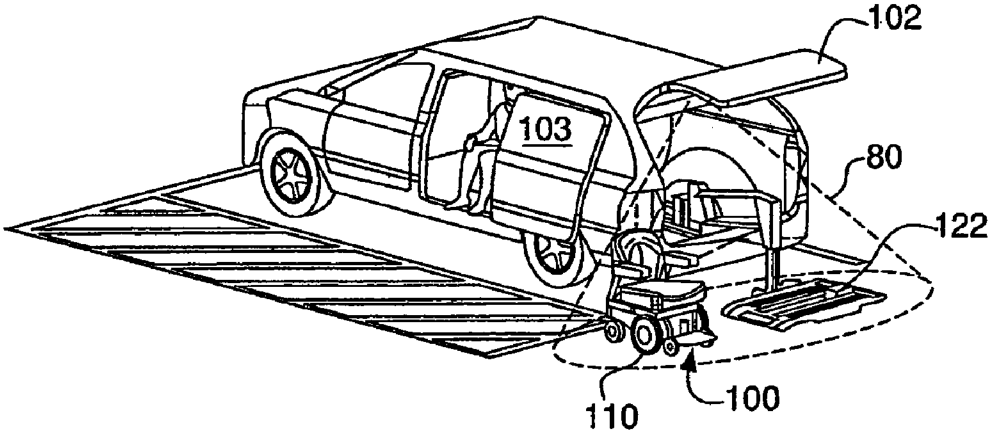
Figure 19A:
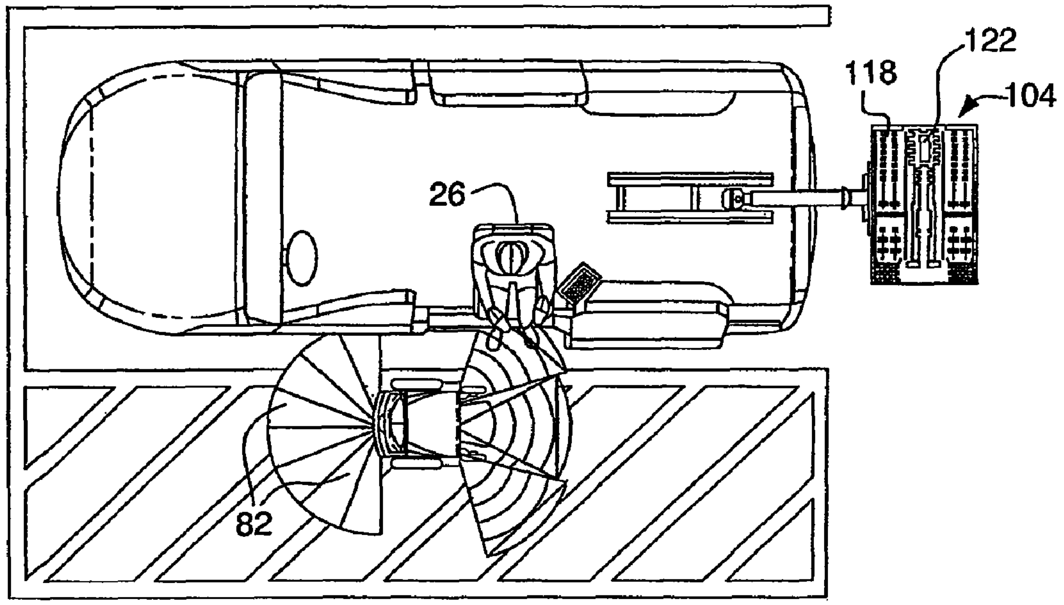
Figure 19B:
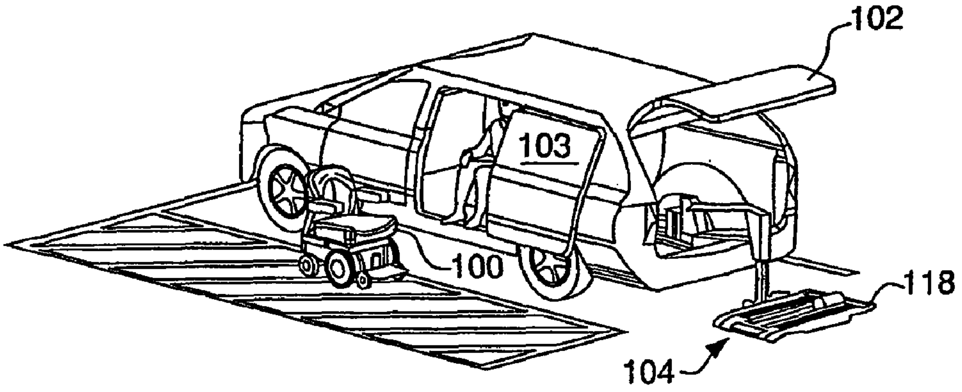

A docking device 122 can be used to secure the power chair 100 in position on the platform 118 (see FIG. 18B). The docking device 122 can include a first portion mounted on the platform 118, and a second portion mounted on the power chair 100. The first and second portions can include complementary mating features to that allow the first portion to securely engage the second portion on a selective basis. The mating features can be disengaged by one or more electric solenoids 123, when the user wishes to drive or otherwise move the power chair 100 off of the platform 118.

The docking device 18 can be, for example, a DOCK-N-LOCK™ docking device available from Freedom Lift Corp. Other types of docking devices can be used in the alternative.

Further details of docking devices suitable for use as part of the system 10 are included in U.S. Pat. No. 6,837,666; and U.S. Pat. No. 7,108,466, which claims priority to U.S. provisional application No. 60/473,674, filed May 27, 2003, and U.S. provisional application No. 60/547,514, filed Feb. 25, 2004. The contents of each of these documents is incorporated by reference herein in its entirety.

The minivan 101 is preferably equipped with a device 113 for actuating, i.e., opening and closing, the liftgate 102 on an automated basis (se FIG. 7A). A device suitable for this purpose can be obtained, for example, from Courtland Mobility Services, Inc. of Burlington, Ontario (Canada), as the LOAD N GO Power Hatch Assist.

The system 10 also includes a third computing device 31, as shown in FIG. 7A. The third computing device 31 can be communicatively coupled to an OEM on-board computer 128 of the minivan 101. The third computing device 31 can access the on-board computer 128 by way of, for example, a diagnostic port of the controller area network (CAN) 129 of the minivan 101. The system 10 can include an I/O interface 33 that facilitates communication between the third computing device 31 and the CAN 129.

The third computing device 31 can also be communicatively coupled to the first computing device 12, the lift and carrier assembly 104, the docking device 122, the actuating mechanism 27 of the seat 17, and the liftgate actuating device 113 by wired connections, or other suitable means. The third computing device 31 manages a serial network that relays control inputs and status information to and from these components, and the on-board computer 128 of the minivan 101.

Figure 10:
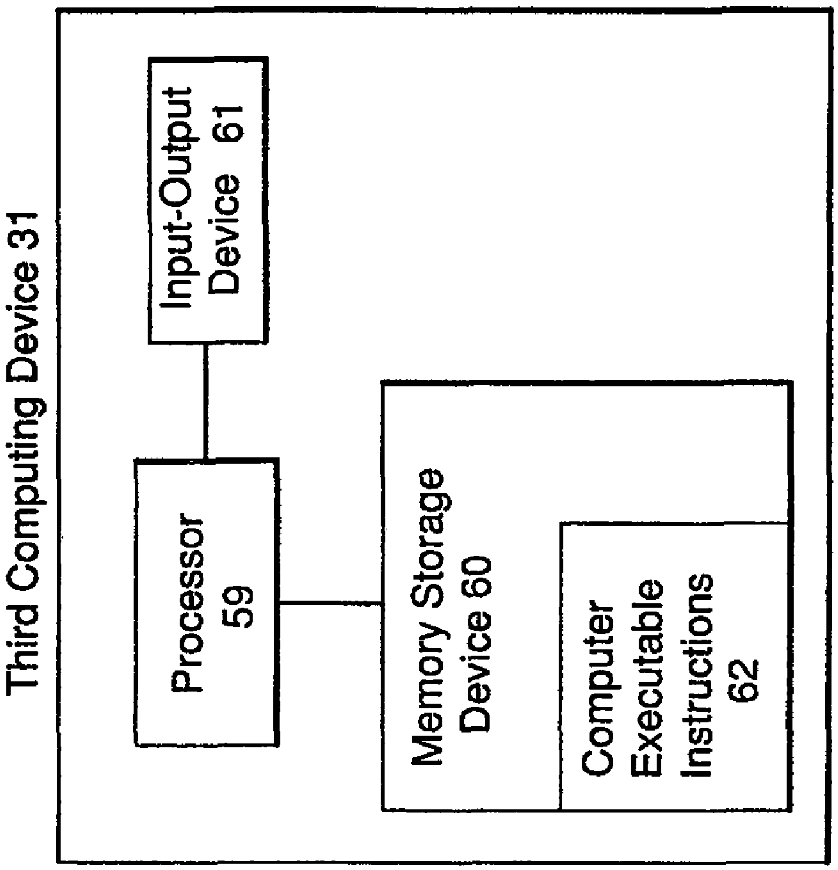
FIG. 10 is a block diagram of another computing device of the system shown in FIGS. 1-3 and 5-9.
Figure 11A:
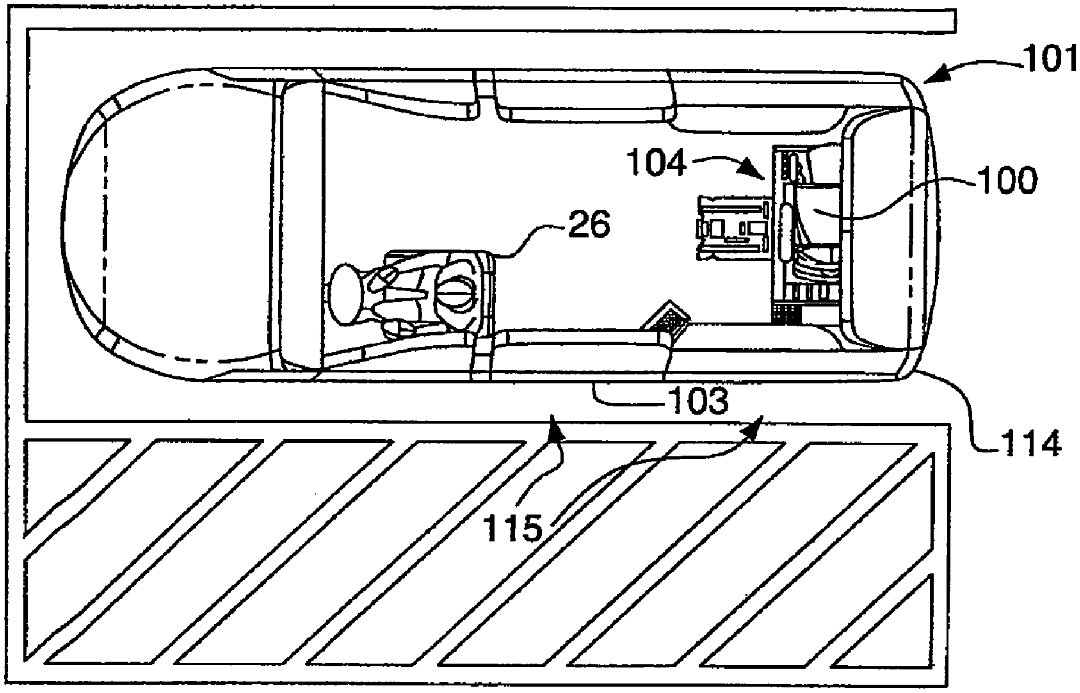
FIGS. 11A-26B are top and perspective views that sequentially depict the system shown in FIGS. 1-10 in use to retrieve the power chair shown in FIG. 1 from a stored position in the minivan shown in FIGS. 2 and 3.
Figure 11B:
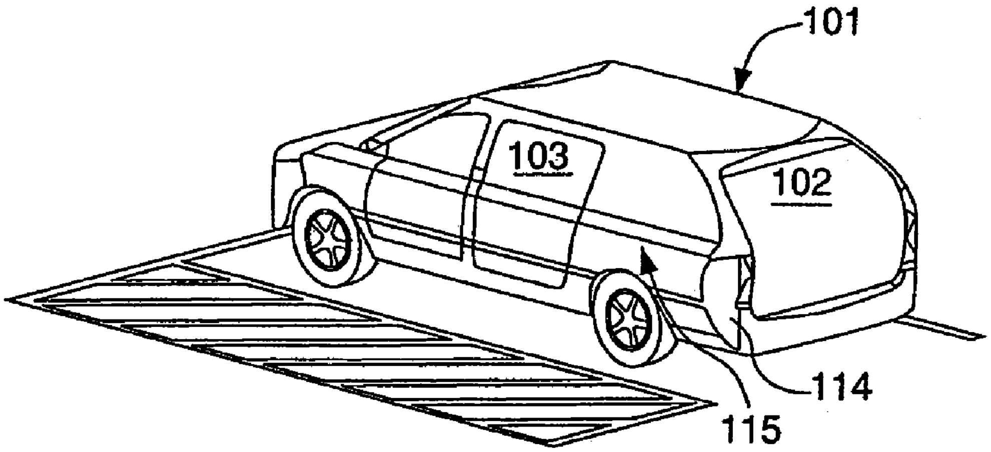
Figure 12A:
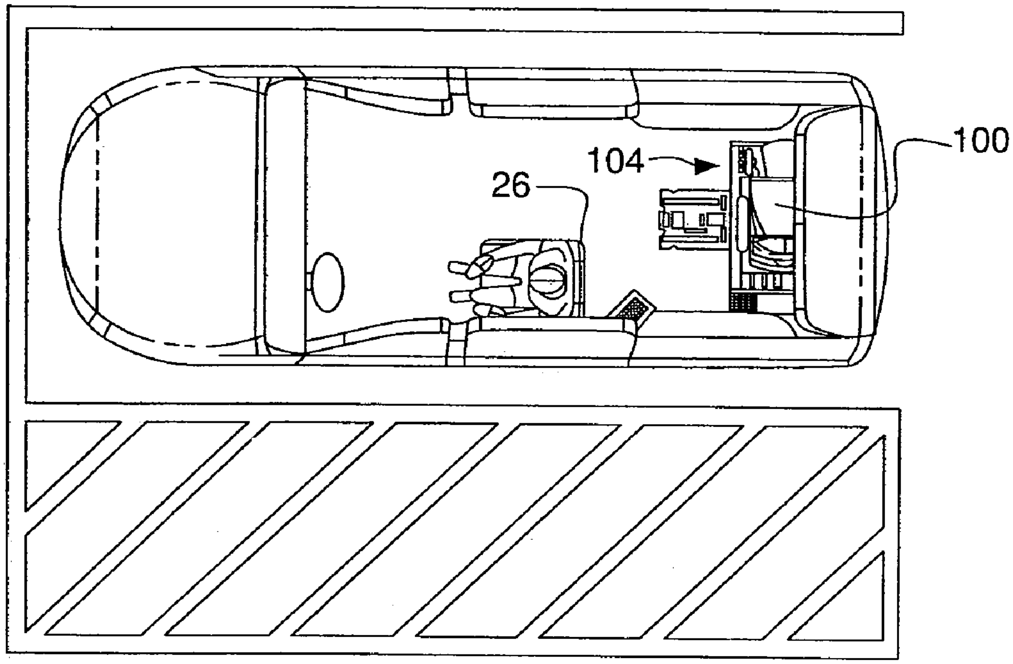
Figure 12B:
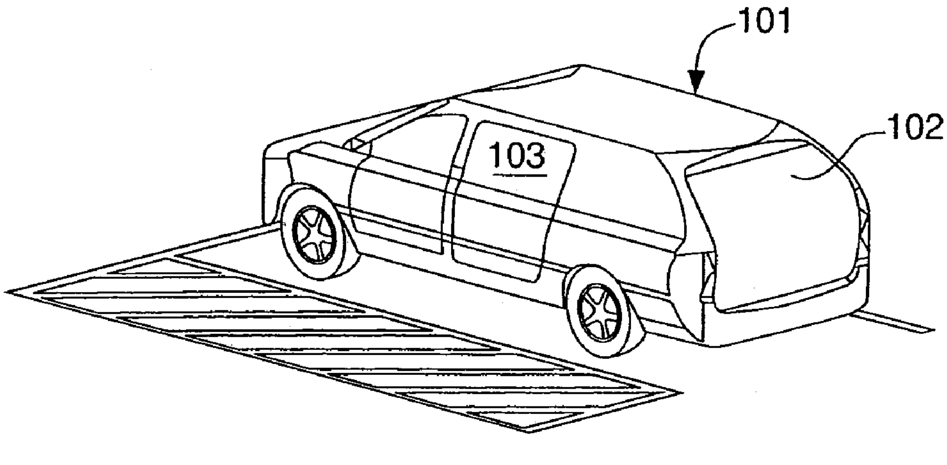

The third computing device 31 can include a processor 59, a memory-storage device 60 communicatively coupled to the processor 59, and a set of computer-executable instructions 62 stored on the memory-storage device 60, as shown in FIG. 10. The processor 59 can be, for example, a microprocessor. The third computing device 31 can also include an input-output device 61 communicatively coupled to the processor 59. The third computing device 31 can be packaged as a circuit board, and can be mounted on the seat 26, or at another suitable location in the minivan 101.

A DirectLOGIC DL205 programmable logic controller equipped with a D2-250-1 central processing unit can be used as a third computing device 31. The use of this particular computing device is disclosed for exemplary purposes only. Other types of computing devices can be used in the alternative.

The computer-executable instructions 62 of the third computing device 31 can include logic that helps coordinate the operation of various components of the system 10 and the minivan 101. For example, the third computing device 31 can be programmed to prevent deployment of the seat mechanism 17 if the side door 103 of the minivan 101 is closed. The third computing device 31 can also be programmed to prevent deployment of the lift and carrier assembly 104 if the liftgate 102 is closed.

The third computing device 31 can also be programmed to prevent activation of the drive motors 108 of the power chair 100 when the docking device 122 is securing the power chair 100 in place on the lift and carrier assembly 104. Other coordination functions can also be programmed into the third computing device 31, as required or desired.

Changes to the computer-executable instructions 62 necessitated by changes in the software of the on-board computer 128 can be input to the third computing device 31 by way of a laptop computer, and a serial port in the third computing device 31.

Figure 6:
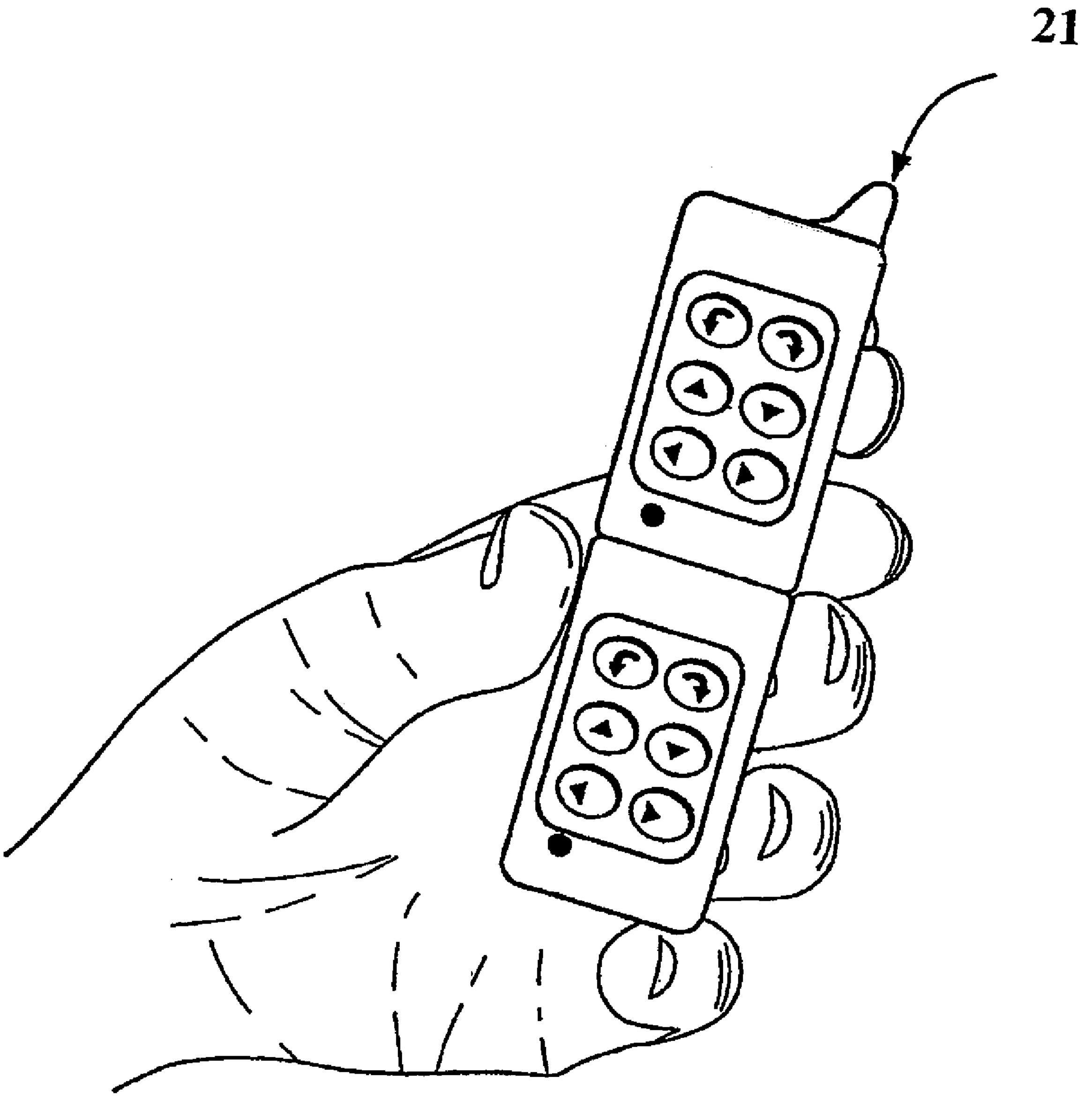
FIG. 6 is a perspective view of a remote control of the system shown in FIGS. 1-3 and 5.

The system 10 can also include a hand-held, multi-channel remote control 21 (see FIGS. 6 and 7A). The remote control 21 can be communicatively coupled to the third computing device 31 by way of a suitable means such as an RF receiver 64 hosted by the third computing device 31. The remote control 21 and the receiver 64 can communicate by other means, such as infrared signals, in the alternative.

The remote control 21 can be utilized by the user to activate various functions of the system 10 and the minivan 101 before and after the user has transferred to the power chair 100 from the seat 26, or as the user initially approaches the minivan 101 in the power chair 100.

For example, the remote control 21 and the third computing device 31 can be programmed so that the user can initiate the opening or closing of the side door 103 and the lift gate 102 using the remote control 21. The command to open the liftgate 102 can be relayed to the liftgate actuating device 113 by way of the RF receiver 64, and the third computing device 31.

The command to open the side door 102 can be relayed to the controller 109 of the minivan 101 by way of the RF receiver 64, the third computing device 31, and the CAN 129 of the minivan 102. The controller 109, in response, can generate an output that activates the OEM motor 111 associated with the side door 103.

The remote control 21 and the third computing device 31 can also be configured so that the user can activate the seat system 17, the lift and carrier assembly 104, and the docking device 122 using the remote control 21.

Moreover, the remote control 21 and the first computing device 12 can be programmed to activate functions of the minivan 101 normally activated using the OEM key fob. For example, the remote control 21 can be programmed to activate key fob functions as arming an de-arming an OEM alarm, locking and unlocking doors, etc., by way of the RF receiver 64, the third computing device 31, and the on-board computer 128.

Details concerning operation the system 10 are as follows. The system 10 can be used to automatically transfer the power chair 100 from a first position located on the lift and carrier assembly 104, and a second position located proximate the side door 102, as discussed above. This feature can be used, for example, when the user (in this case, the driver of the minivan 101) parks the minivan 101, and wishes to transfer to the power chair 100.

Figure 13A:
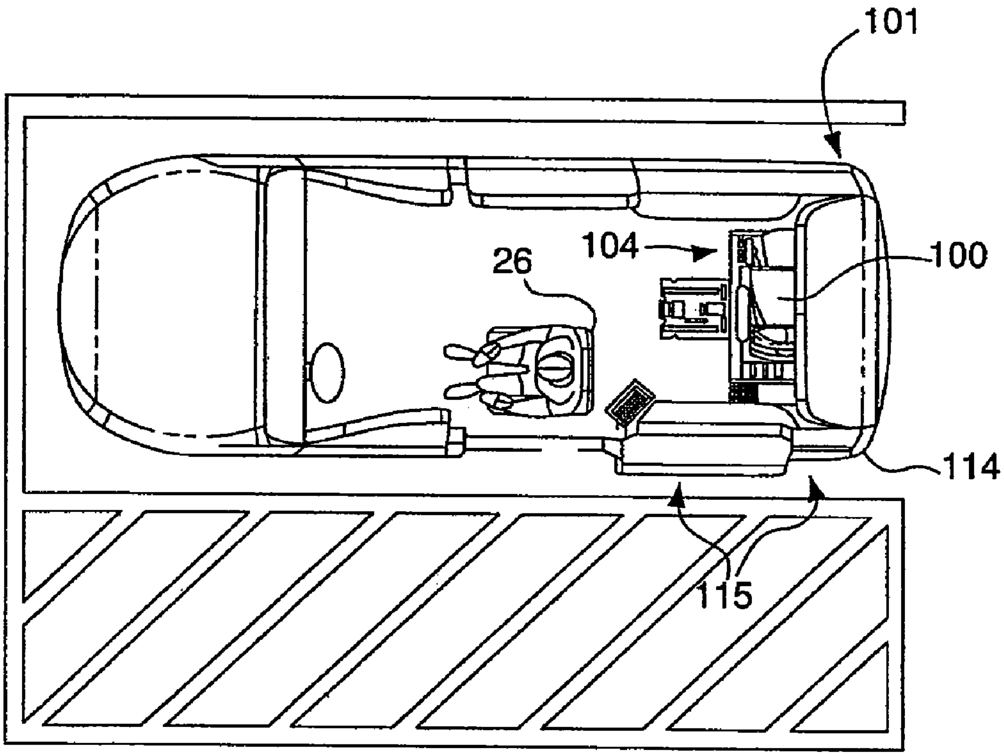
Figure 13B:
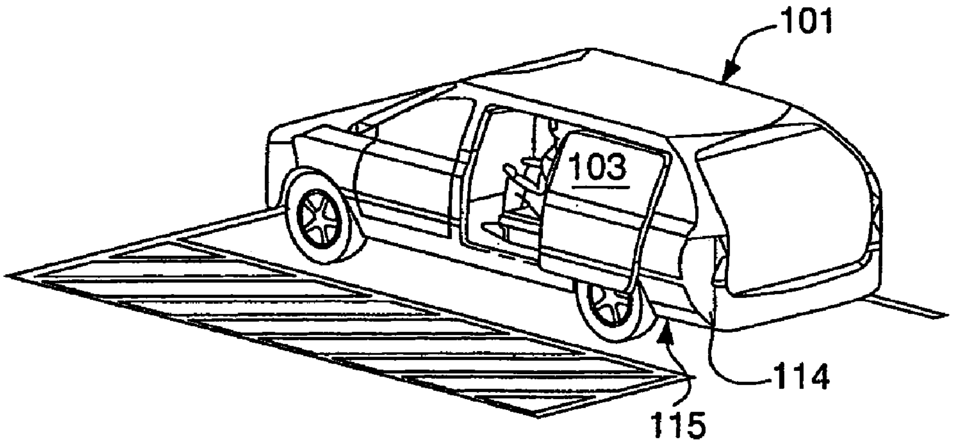
Figure 14B:
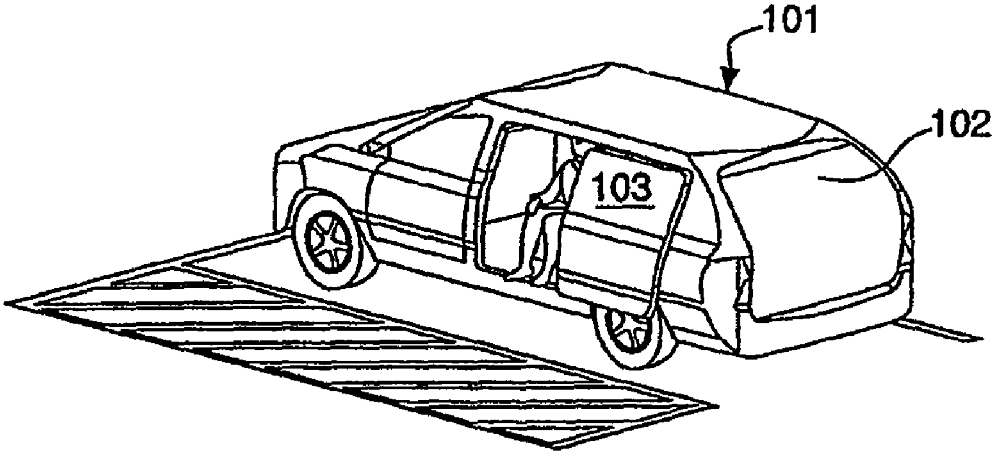

Automated transfer of the power chair 100 can be accomplished as follows. The user can command the actuating mechanism 27 of the seat system 17 to move the seat 26 rearwardly, to the position depicted in FIG. 12A, by pressing a corresponding button on the remote control 21. The user can initiate opening of the side door 102 by pressing another button on the remote control 21 (FIGS. 13A, 13B). The user can subsequently use the remote control 21 to command the actuating mechanism 27 to turn the chair 26 so that the chair 26 faces outwardly, as shown in FIGS. 14A and 14B. (The sequence of these activities, and those activities discussed, is not necessarily limited to the sequence discussed herein.)

Figure 15A:
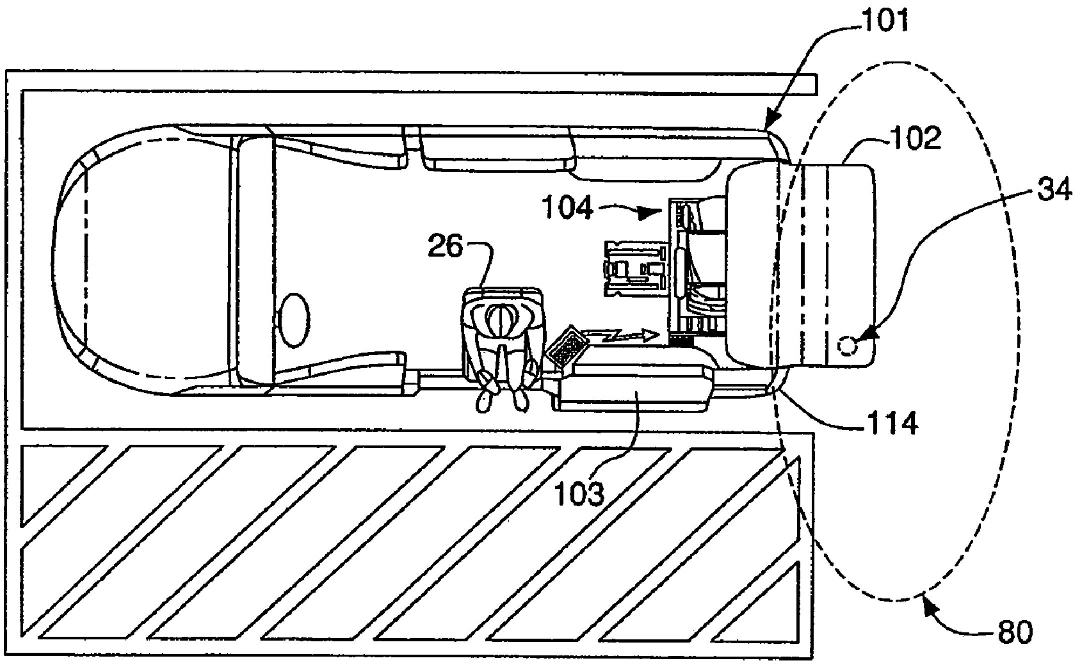
Figure 15B:
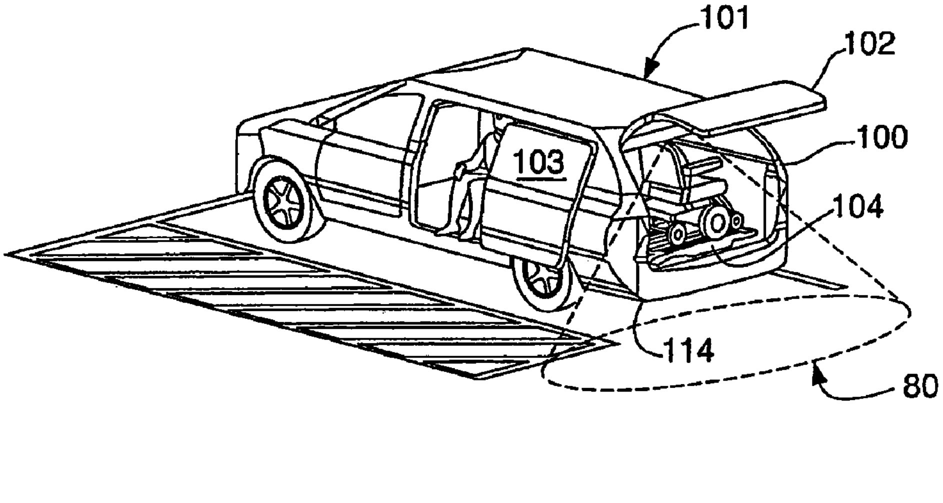
Figure 16A:
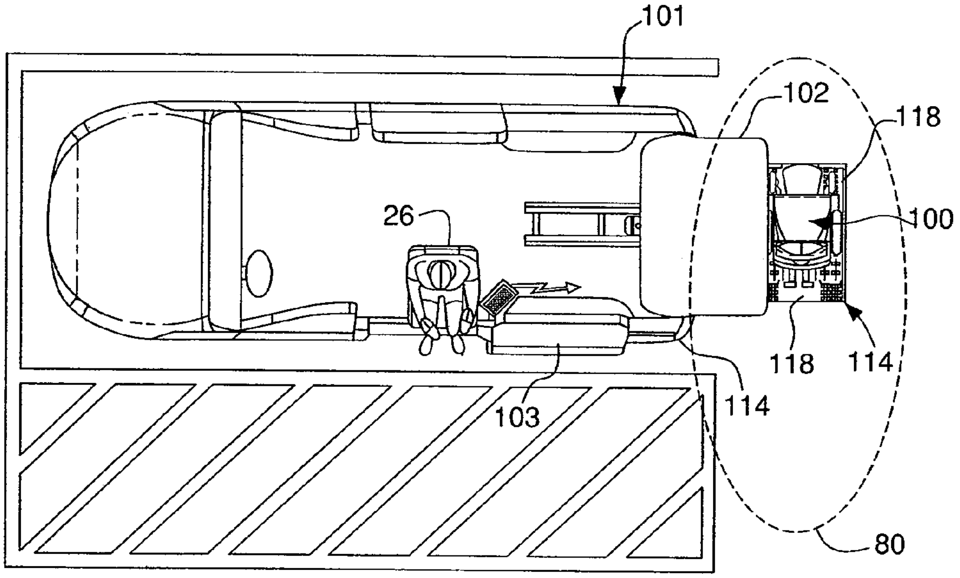
Figure 16B:
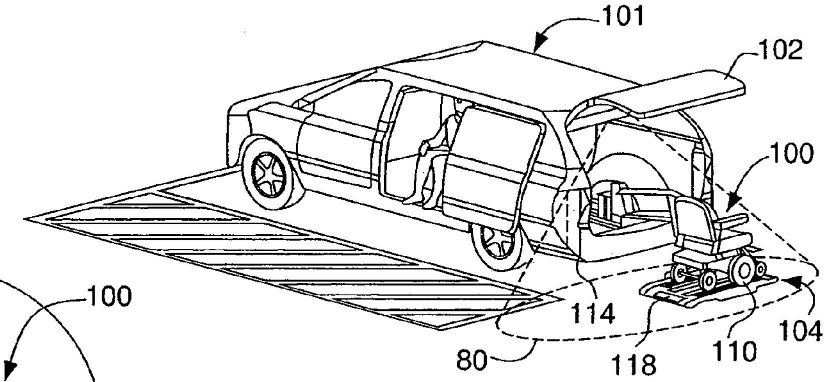
Figure 16C:
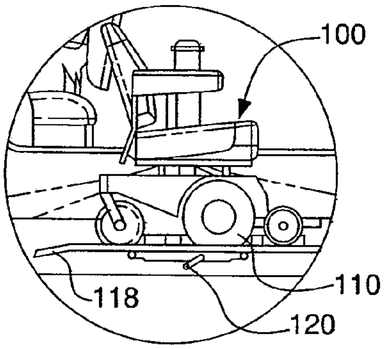
Figure 17A:
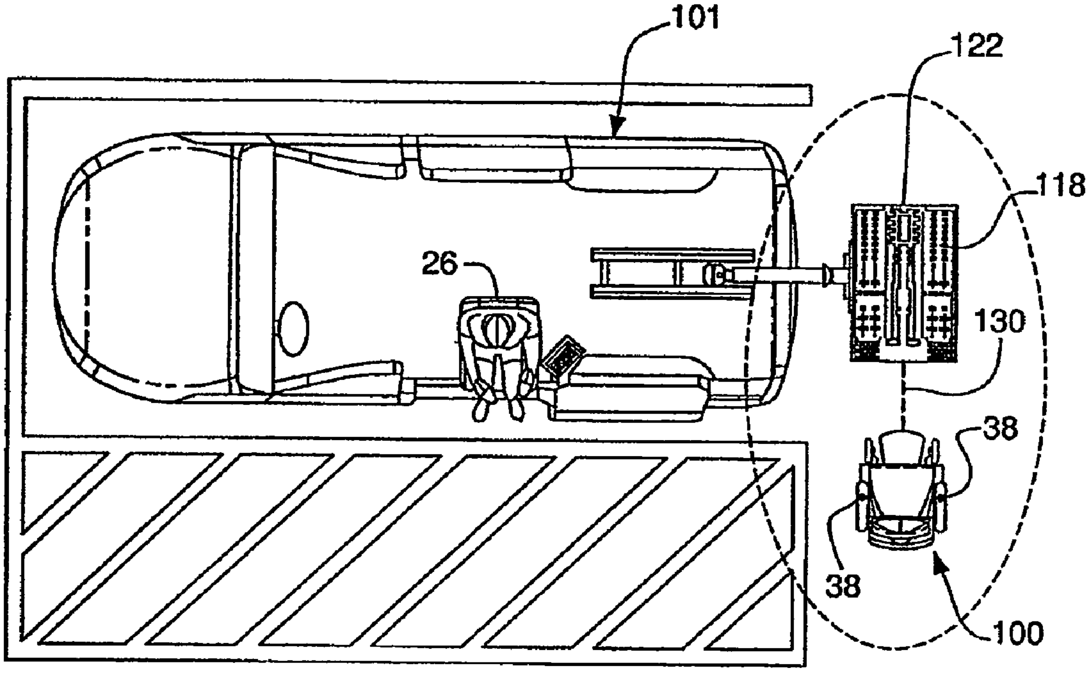
Figure 17B:
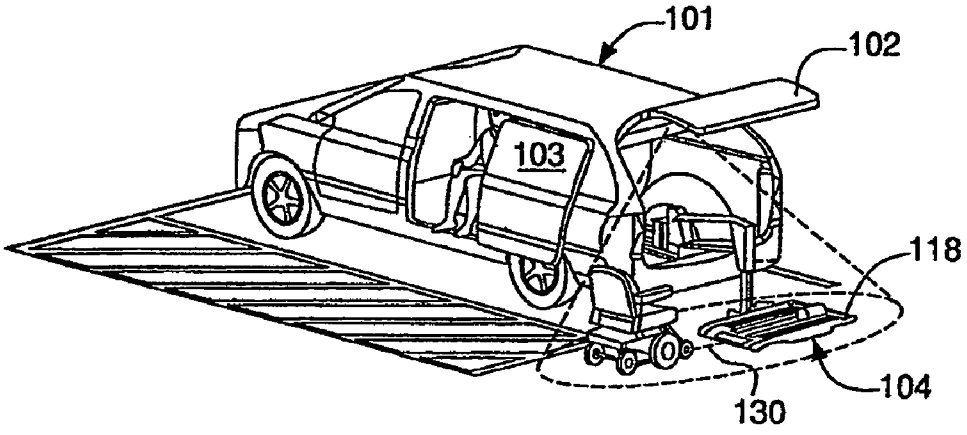

The user can initiate opening of the liftgate 102 by pressing a corresponding button on the user remote control 21, to activate the liftgate actuating device 113 (FIGS. 15A, 15B). The user can subsequently initiate deployment of the lift and carrier assembly 104 by pressing another button on the remote control 21. The lift and carrier assembly 104 is then deployed, i.e., extended and lowered, so that the platform 118 of the lift and carrier assembly 104 rests on the ground, immediately behind the minivan 104 (FIGS. 16A, 16B). The user can subsequently use the remote control 21 to command the docking device 122 to release the power chair 100.

The power chair 100 is ready at this point to be automatically transferred to the second position proximate the side door 103. The user can activate the automatic transfer by touching a corresponding icon on the touchscreen 56 of the user interface device 23.

The vision system 14 becomes active, i.e., the vision system begins acquiring and generating data representative of the field of view of the camera, as the automatic transfer is activated.

The first computing device 12 identifies the position of the power chair 100 based on the positions of the fiducial markings 38 within the field of view of the camera 34, using the above described techniques. The first computing device 12 then evaluates the difference between the position of the power chair 100, and a predetermined desired path of travel 130 for the power chair 100 between the first and third positions. Data representing the desired path of travel 130 can be stored in the second computing device 18. This data can be referenced to the same Cartesian coordinate system as the visual-image data generated by the vision system 14, to provide a common frame of reference.

The first computing device 12 generates outputs to guide the power chair 100 toward the second position. The outputs are transmitted to the controller 109 of the power chair 100 by way of the wireless communication system 16 and the second computing device 18. The controller 109, upon receiving the outputs, activates one or both of the drive motors 108 to cause the power chair 100 to translate linearly, or turn.

The first computing device 12 can act as a closed loop controller that calculates a position error, and generates a corrective action based on the position error. In particular, the first computing device 12 can determine the approximate distance (if any) between the position of the power chair 100 at a given moment, and the desired path of travel 130 based on the visual-image data generated by the vision system 14. The first computing device 12 can then determine a corrective action based on the magnitude and direction of error, to guide the power chair 100 toward the desired path of travel 130. The magnitude of the correction, i.e., the extent to which the first computing device 12 commands the power chair 100 to turn, can be determined by the first computing device 12 using integral, proportional, or derivate control techniques, or a combination thereof.

The first computing device 12 is programmed to guide the power chair 100 through a turn of approximately ninety degrees when the power chair 100 reaches the third position, so that the rear of the power chair 100 faces forward, i.e., toward the first position (FIGS. 17A-18B).

The first computing device 12 and the second computing device 18 can exchange a handshake once the power chair 100 has completed its turn, to switch the guidance of the power chair 100 to chair mode. The vision system 14 is deactivated at this point, and the rangefinder 20 and odometry system 19 are activated. The second computing device 18 begins generating control outputs that cause the motors 108 to move the power chair 100 along a desired path of travel 132 between the third and second positions.

The second computing device 19 generates outputs to guide the power chair 100 toward the first position. The controller 109 of the power chair 100, upon receiving the outputs, activates one or both of the drive motors 108 to cause the power chair 100 to translate linearly, or turn.

The power chair 100 navigates between the third and second positions based on inputs from the rangefinder 20 and the odometry system 19. The second computing device 18 has data stored therein representing the profile of the left side 115 of the minivan 101 (with the side door 103 open, as shown in FIGS. 13A and 13B). More particularly, the second computing device 18 has multiple sets of coordinates stored therein. Each coordinate set includes a first value representing the distance between the power chair 100 and the side 115 of the minivan 101. Each coordinate set also includes a second value corresponding to the particular location along the desired path of travel 132 at which the corresponding distance value applies.

The second computing device 18 can act as a closed loop controller that calculates a position error, and generates a corrective action based on the position error. In particular, the second computing device 18 can determine an approximate difference (if any) between the position of the power chair 100 at a given instant, and the desired path of travel 132. The desired path of travel 132 is referenced from the side 115 of the minivan 101, and to a particular point along the path of travel 130. Thus, the difference between a range reading generated by the rangefinder 20 at a particular instant, and the desired distance between the power chair 100 and the side 115, can provide an approximate indication of the position error at that moment.

An estimate of the position of the power chair 100 along the desired path of travel 132 can be obtained using the distance by which the power chair 100 has moved from the third position, as determined by the odometry system 19. This position can be used to reference a particular value for the desired distance between the power chair 100 and the side 115 of the minivan 101 from the coordinate set stored within the second computing device 18.

The second computing device 18 can then determine a corrective action based on the magnitude and direction of the error, to guide the power chair 100 toward the desired path of travel 132. The magnitude of the correction, i.e., the extent to which the second computing device 18 commands the power chair 100 to turn, can be determined by the second computing device 18 using integral, proportional, or derivate control techniques, or a combination thereof.

The second computing device 18 is preferably programmed to guide the power chair 100 through a turn of approximately ninety degrees when the power chair 100 reaches the first position, and to back the power chair 100 toward the side 115 of the minivan 101. This action places the power chair 100 in a position and orientation favorable for transfer of user from the seat 26 to the power chair 100.

The second computing device 18 can also be programmed recognize objects in the path of travel of the power chair 100 as obstacles, based on returns from the rangefinder 20 that do not substantially match the expected profile of the side 115 at a given point along the desired path of travel 132. The second computing device 18 can also be programmed to take corrective action to steer the power chair 100 around the obstacles. Moreover, the second computing device 18 can be programmed to recognize particular features of the minivan 102, such as the B pillar 106, based on the pattern of the returns from the rangefinder 20 as the power chair 102 moves between the third and second positions.

Figure 23B:
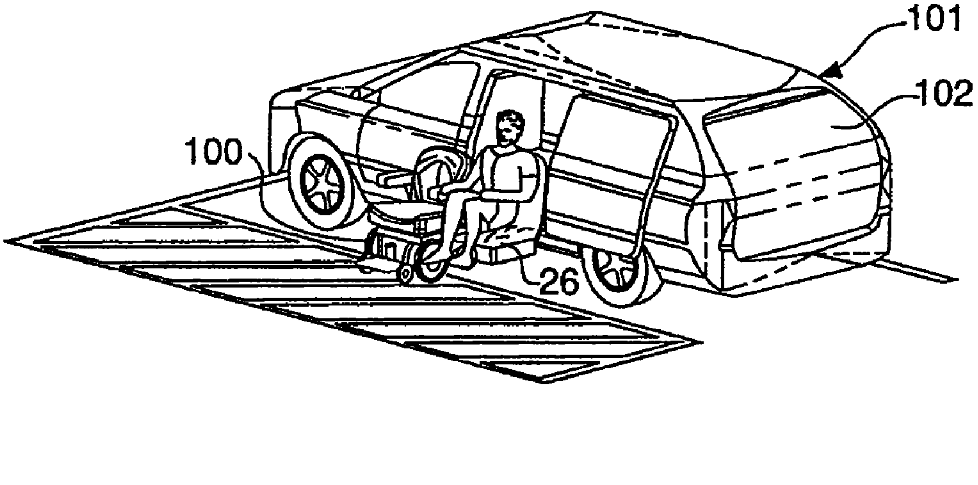
Figure 24A:
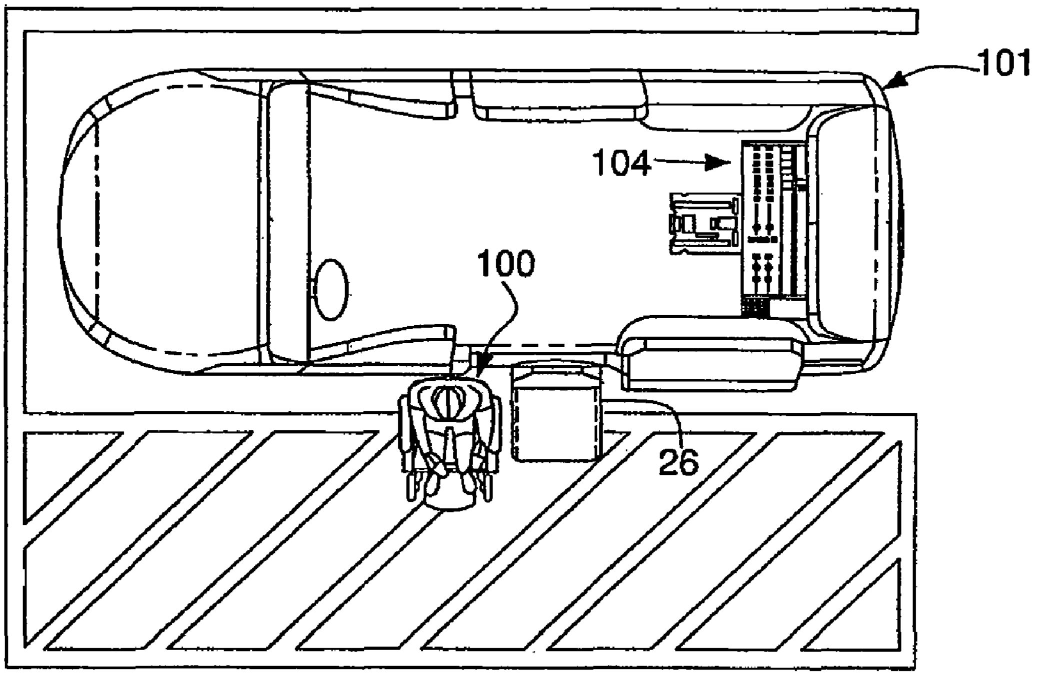
Figure 24B:
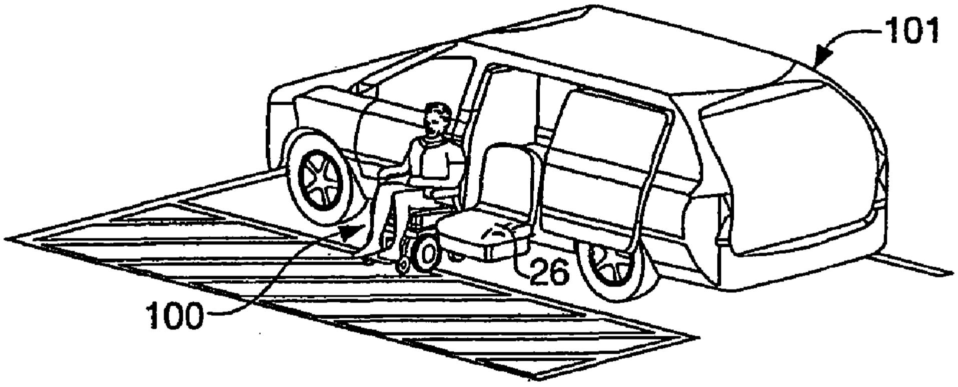

The user can subsequently use the remote control 21 to command the actuating mechanism 27 of the seat system 17 to extend the seat 26 from the minivan 100, and to lower the seat 26 to a position immediately adjacent the power chair 100 (FIGS. 23A, 23B). The user can then transfer from the seat 26 to the power chair 100 (FIGS. 24A, 24B).

Figure 25A:
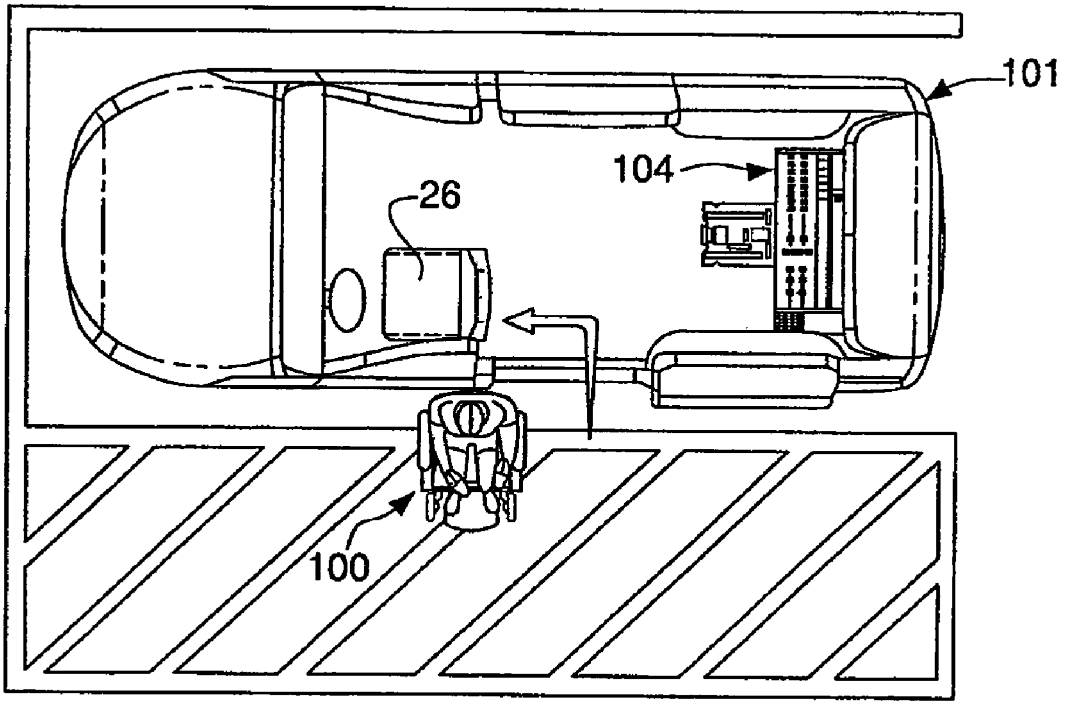
Figure 25B:
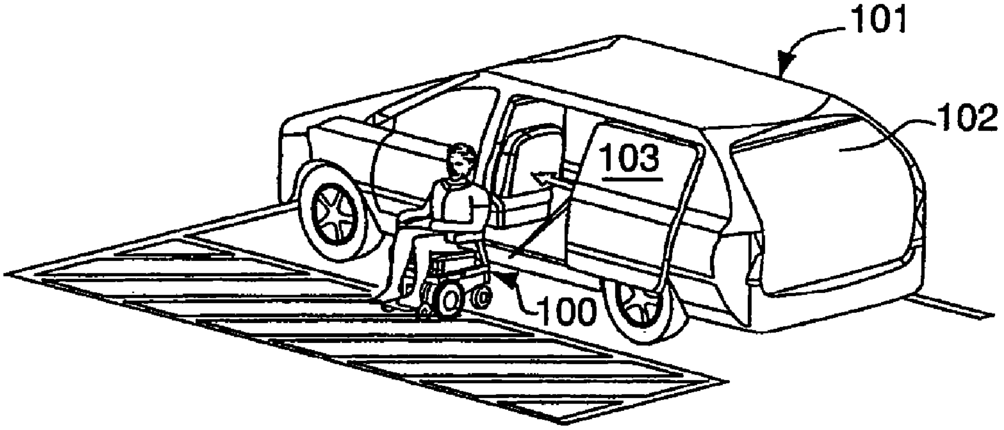
Figure 26A:
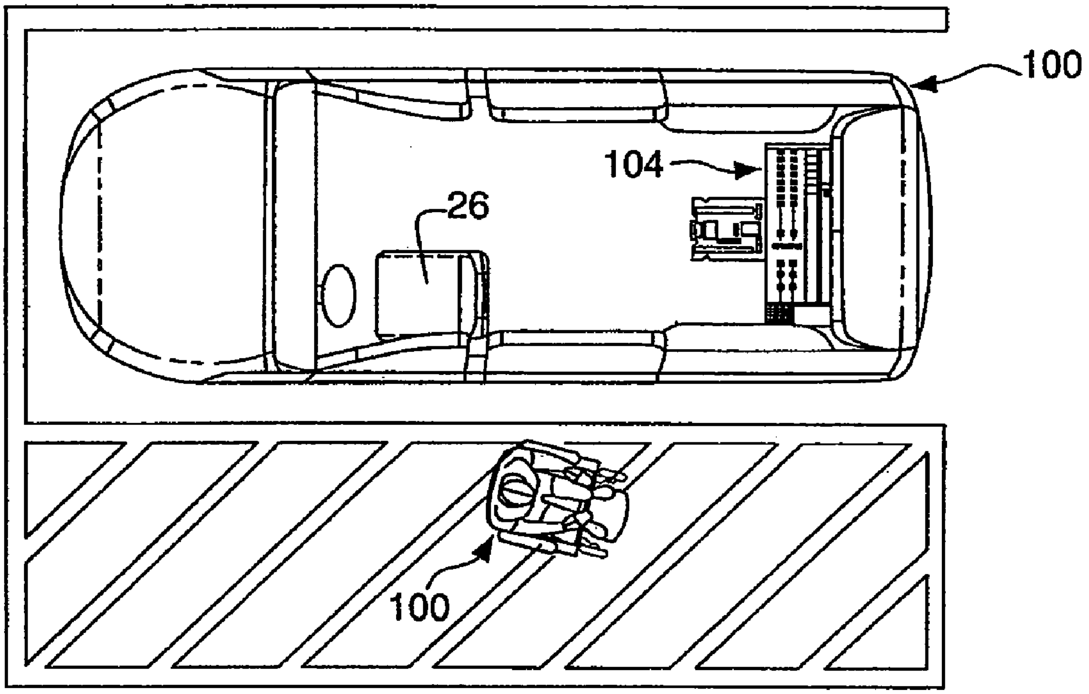
Figure 26B:
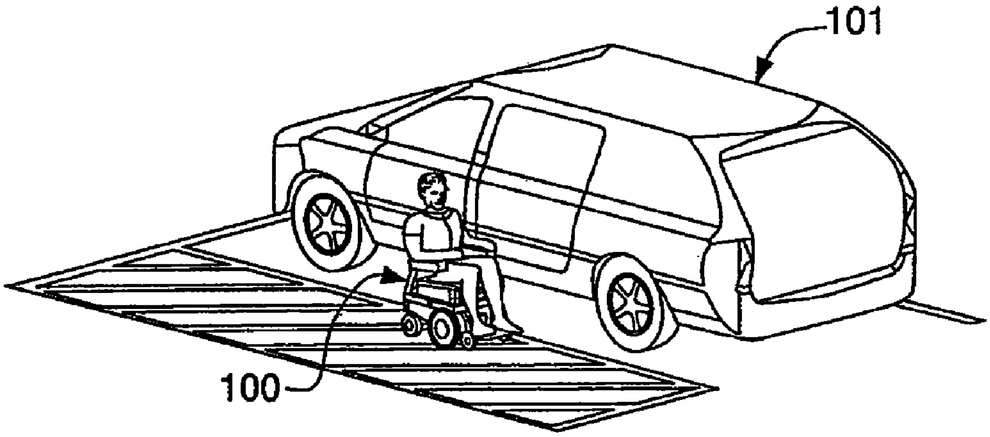
Figure 27:
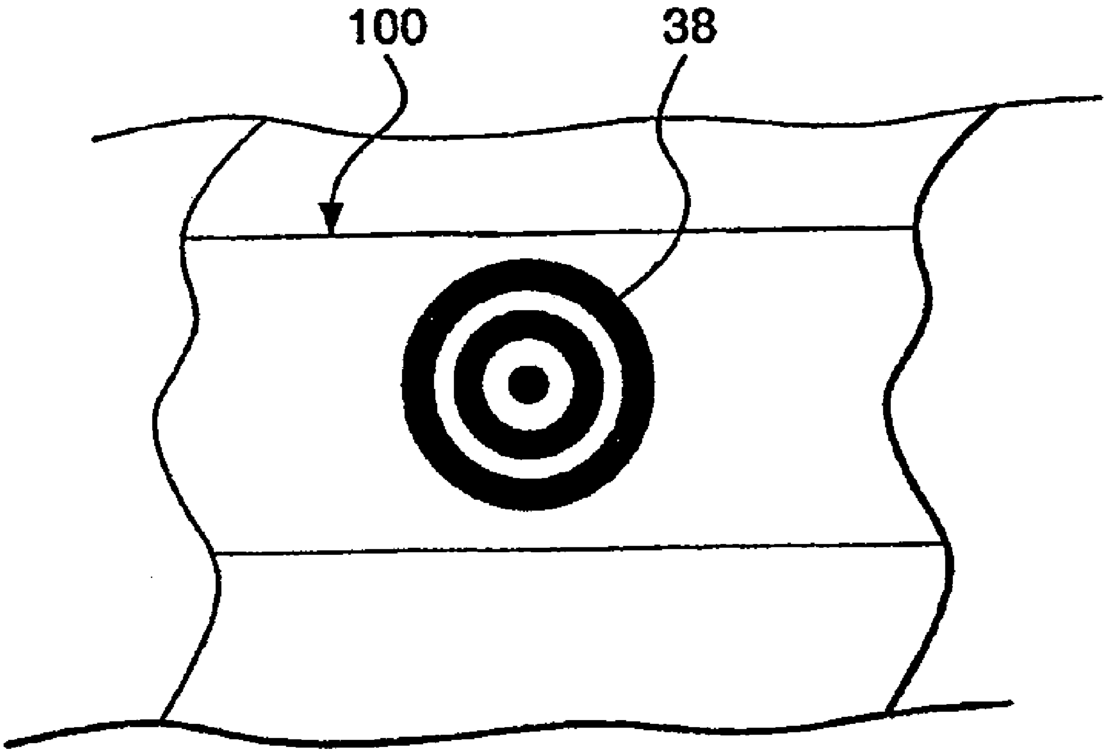
FIG. 27 is a magnified view of the area designated σAμ in FIG. 18A.

The user, after transferring to the seat 26, can use the remote control 21 to cause the seat 26 and the lift and carrier assembly 104 to retract into the minivan 101, and the lift gate 102 and the side door 103 to close (FIGS. 25A and 25B). The remote control 21 can also be used to lock the doors, and set the alarm of the minivan 101.

Upon returning to the minivan, user can enter the minivan 101 and the system 10 can automatically stow the power chair 100 in a process substantially the reverse of the above process. In particular, the user can initiate the opening of the side door 103 and the liftgate 102 of the minivan 101 using the remote control 21, as the user approaches the minivan 101. The user can then initiate the extension and lowering of the seat 26 and the lift and carrier assembly 104, using the remote control 21.

The user can drive the power chair 100 so that the power chair 100 is positioned next to the seat 26. The user can then transfer to the seat 26. Once seated, the user can initiate retraction of the seat 26 into the minivan 101 using the remove control 21. The side door 102 can be closed after the seat 26 has been retracted, in response to a command generated using the remote control 21.

The user can initiate automatic transfer of the power chair 100 to the first position on the lift and carrier assembly 104 by touching a corresponding icon on the touchscreen 56 of the user interface device 23. The power chair 100 can translate toward the third position in chair mode as described above, using ranging and odometry data generated by the rangefinder 20 and the odometry system 19. The first computing device 12 can assume control of the movement of the power chair 100 when the power chair 100 reaches the third position. The first computing device 12 can then generate commands to guide the power chair 100 to the first position on the lift and carrier assembly 104 in vision mode, as described above, based on inputs from the vision system 14.

The user can initiate retraction of the lift and carrier assembly 104 into the minivan 101 after the power chair 101 has reached the first position on the platform 118, using the user interface device 23. The liftgate 102 can subsequently be lowered in response to another command generated using the user interface device 23.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

For example, the functions of the first, second, and third computing devices 12, 18, 31 can be incorporated into one or two computing devices located on the minivan 102 or the power chair 100. Moreover, first, second, or third computing devices 12, 18, 31 can be programmed so that the activation of the side door 103, liftgate 102, lift and carrier assembly 104, and docking device 122 can be initiated by the same user input that initiates the transfer of the power chair 100 between the first and second positions.

Figure 28A:
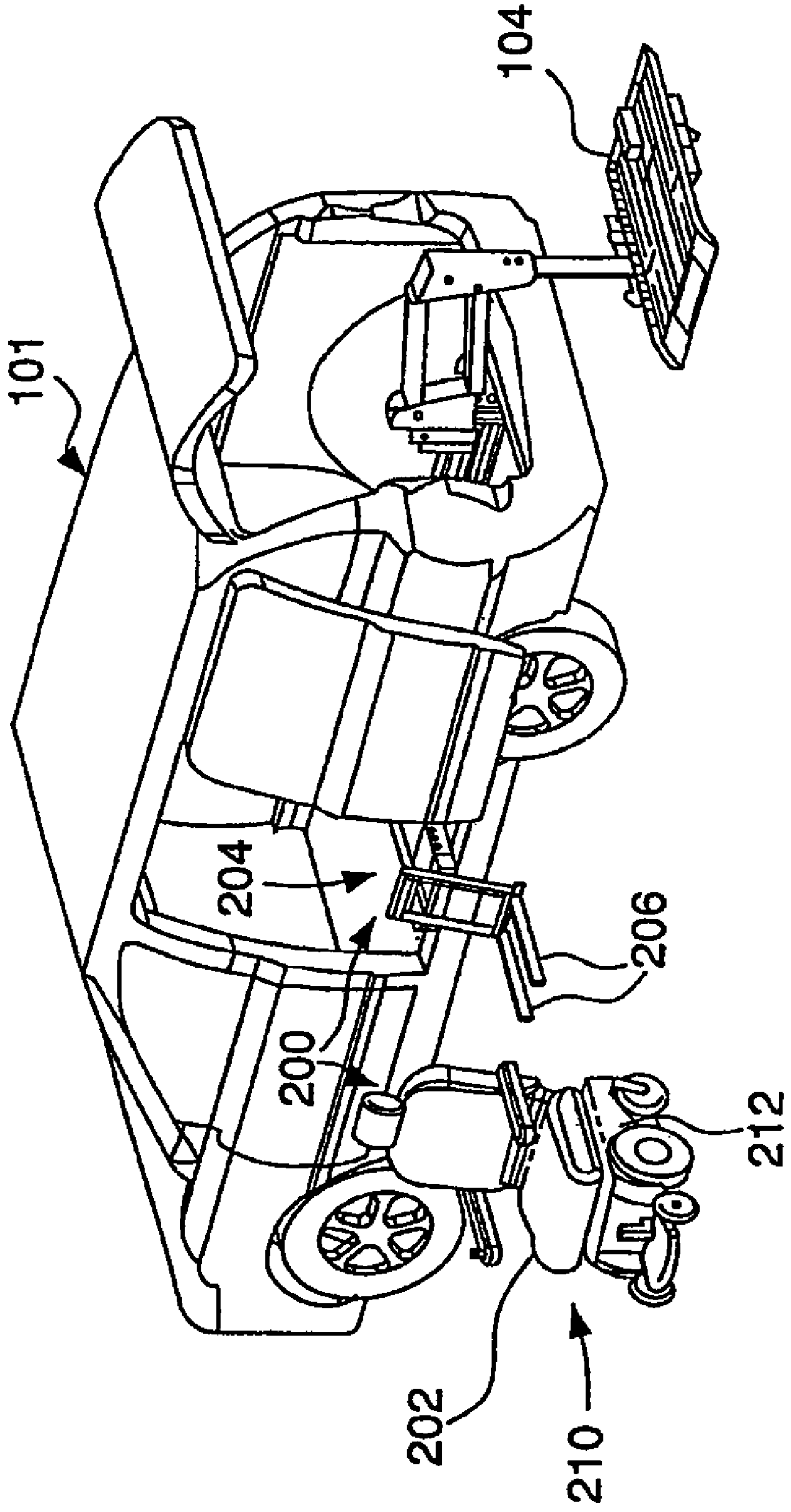
FIGS. 28A-28H depict an alternative embodiment of the seat system shown in FIG. 4.
Figure 28B:
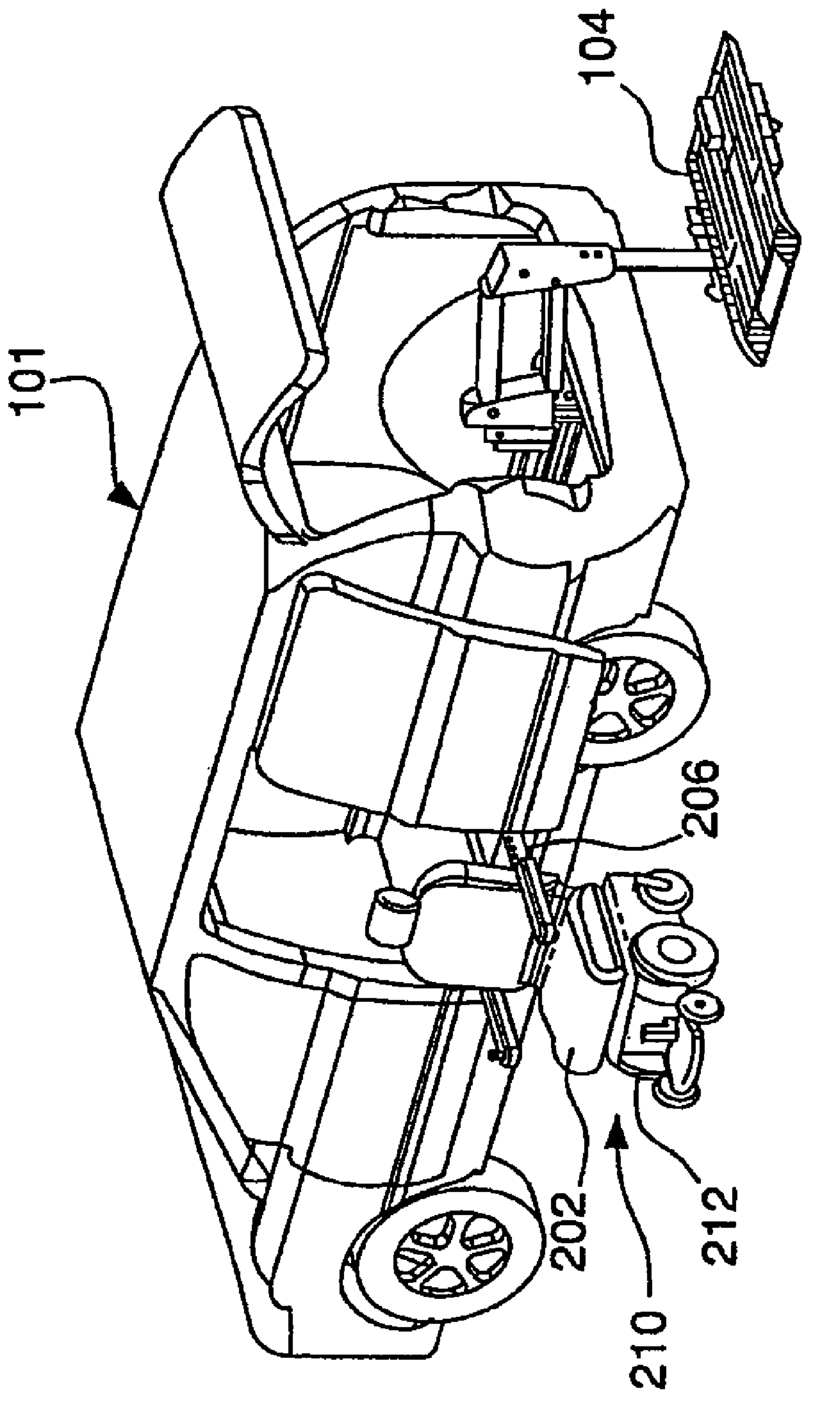

FIGS. 28A-28H depict an alternative embodiment of the seat system 17 in the form of a seat system 200. The seat system 200 includes a seat 202, and an actuating mechanism 204. The actuating mechanism 204 can move the seat 202 between a first position (not shown) and a second position (FIG. 28B). The seat 202, when in the first position, places the user in a position suitable for operating the minivan 101.

The seat 202 forms part of a power chair 210. The seat 202, when in the second position, can be transferred onto and off of a base 212 of the power chair 210 (see FIGS. 28B and 28C). The actuating mechanism 204 can be substantially similar to the actuating mechanism 27 of the seat system 17, with the exception that the seat 202 can detach from rails 206 that form part of the actuating mechanism 204, so that the seat 202 can be used as part of the power chair 210. The use of the seat system 200 can thus eliminate a need for the user to transfer to and from separate seats when moving between the minivan 101 and the power chair 210.

Figure 28C:
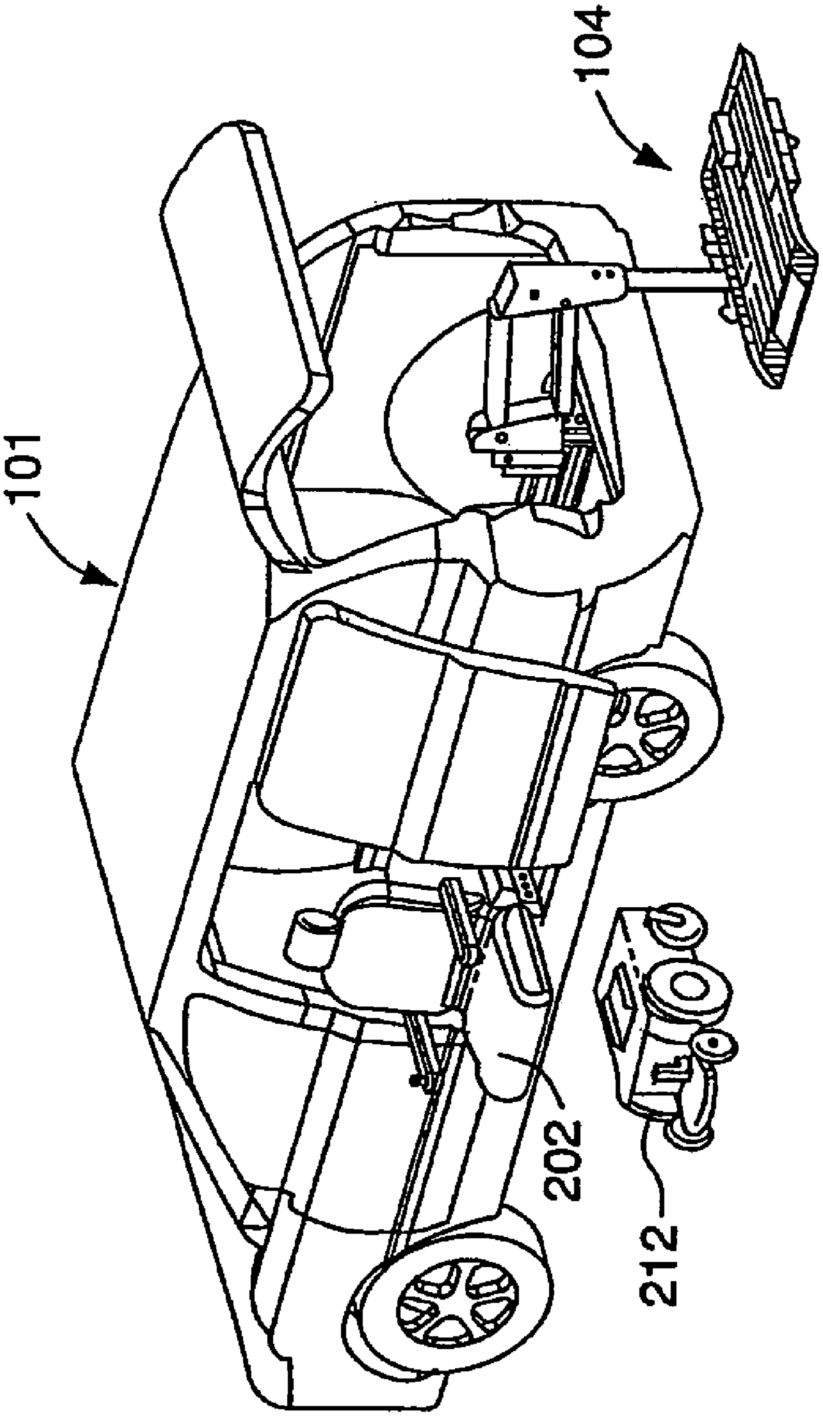

The system 10 can be configured to guide the power chair 210 from a stored position on the lift and carrier assembly 104 (FIGS. 28F-28H), to the position depicted in FIG. 28A. The system 10 can then cause the power chair 210 to back up toward the rails 206, as depicted in FIGS. 28A and 28B, so that the rails 206 become disposed in mating provisions formed on the seat 202. The actuating mechanism 204 can then lift the seat 202 (and the user) from the base 212 (FIG. 28C). (The user is not depicted in FIGS. 28A-28H, for clarity.) The actuating mechanism 204 can subsequently move the seat 202 and the user to the first position, as depicted in FIGS. 28C-28E, 28G, and 28H. (The seat system 200 can be adapted to move the user to other positions within the minivan 101, in alternative embodiments.)

Figure 28D:
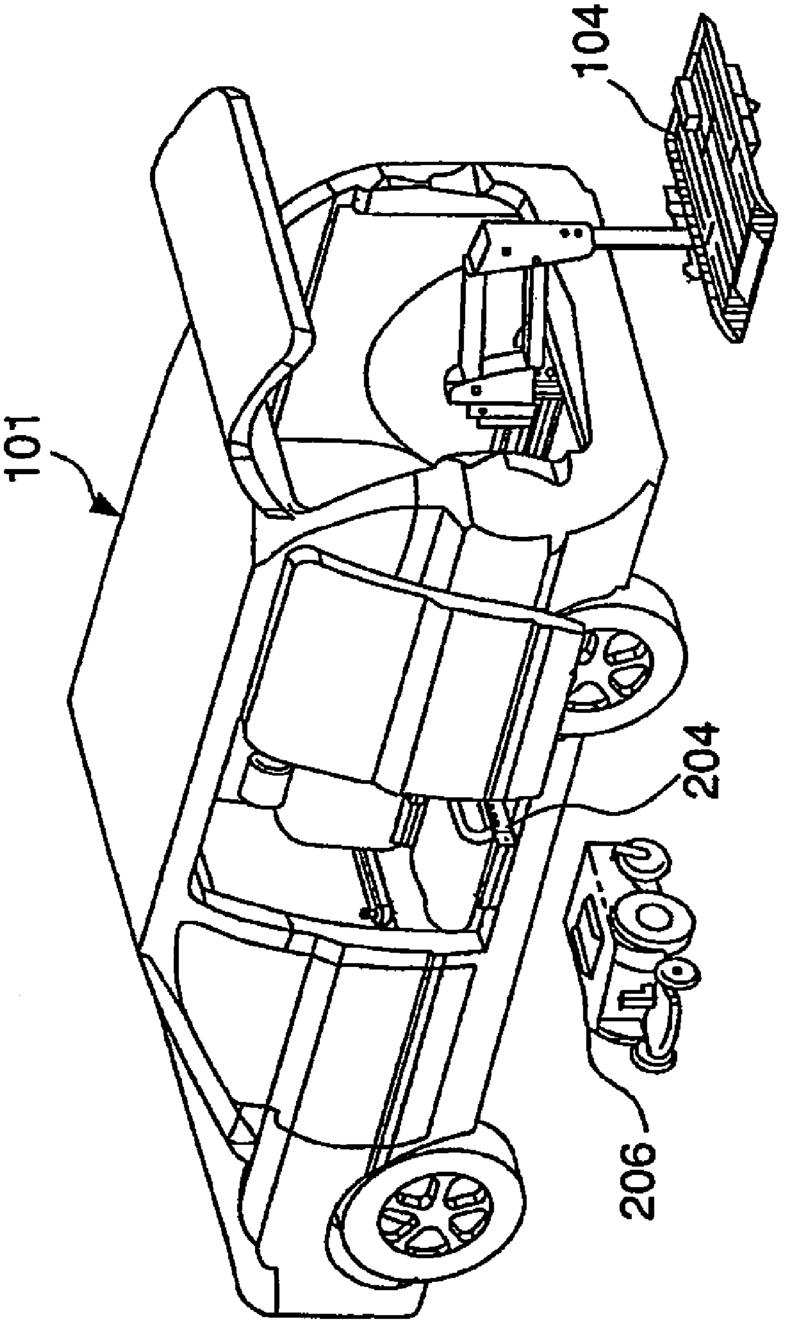
Figure 28E:
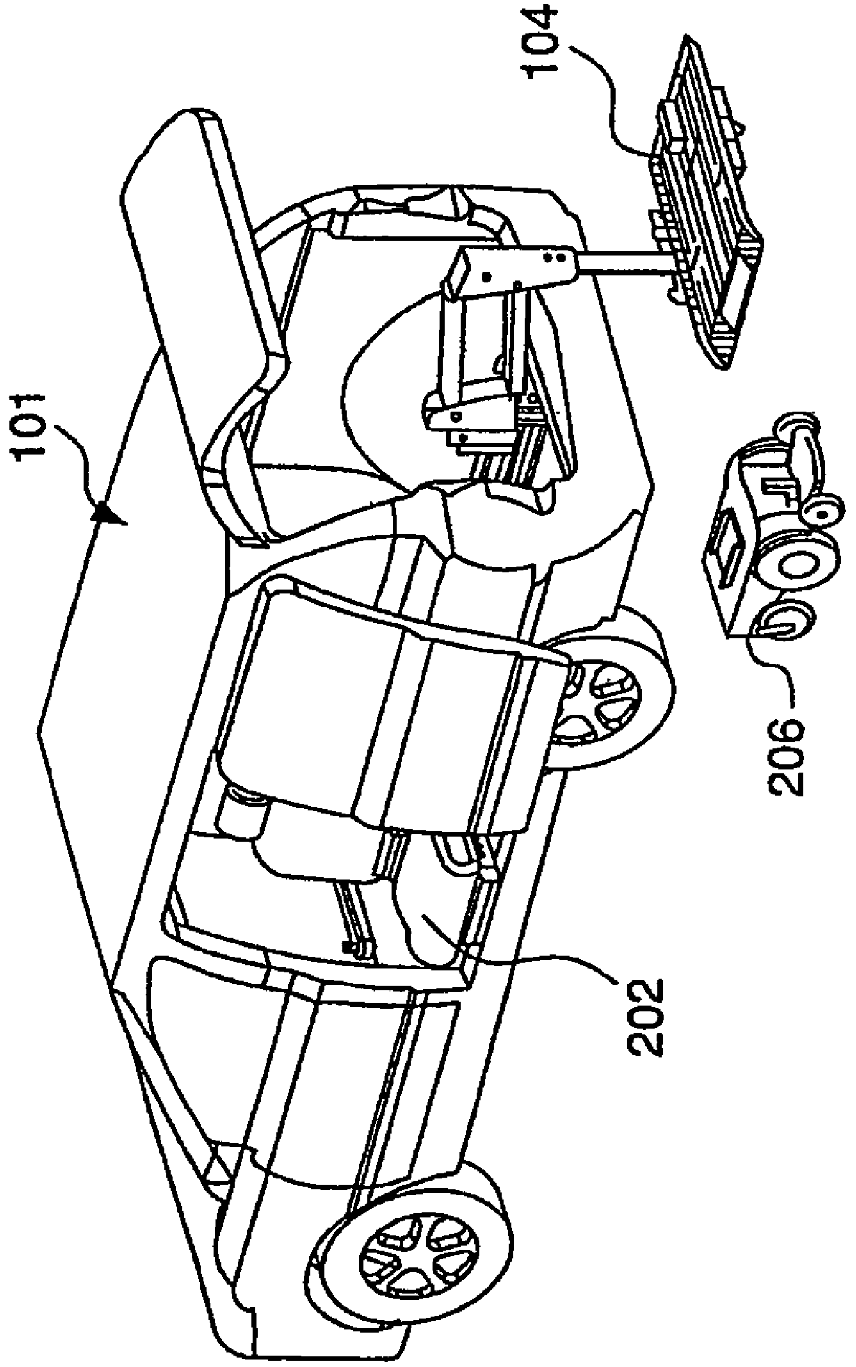
Figure 28F:
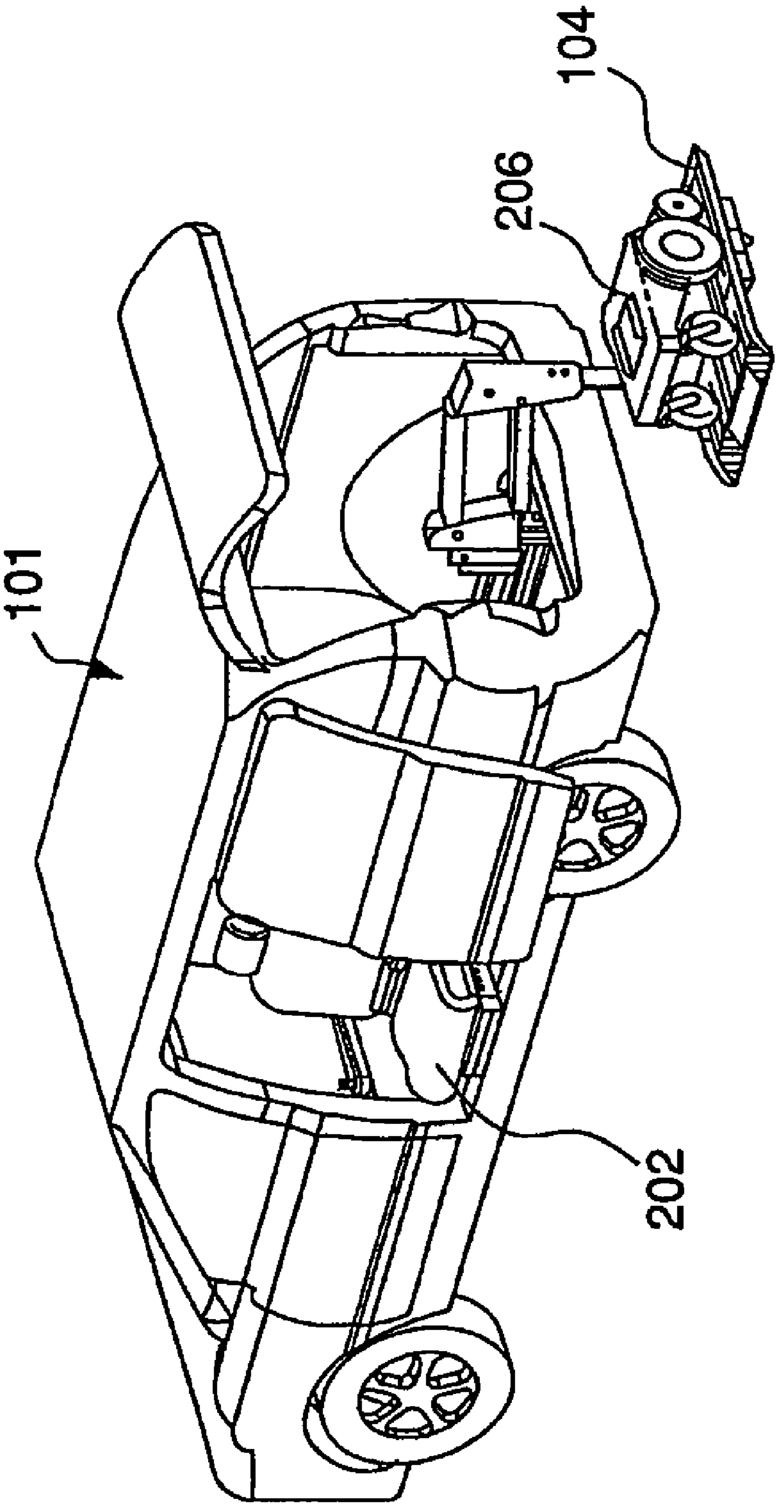
Figure 28G:
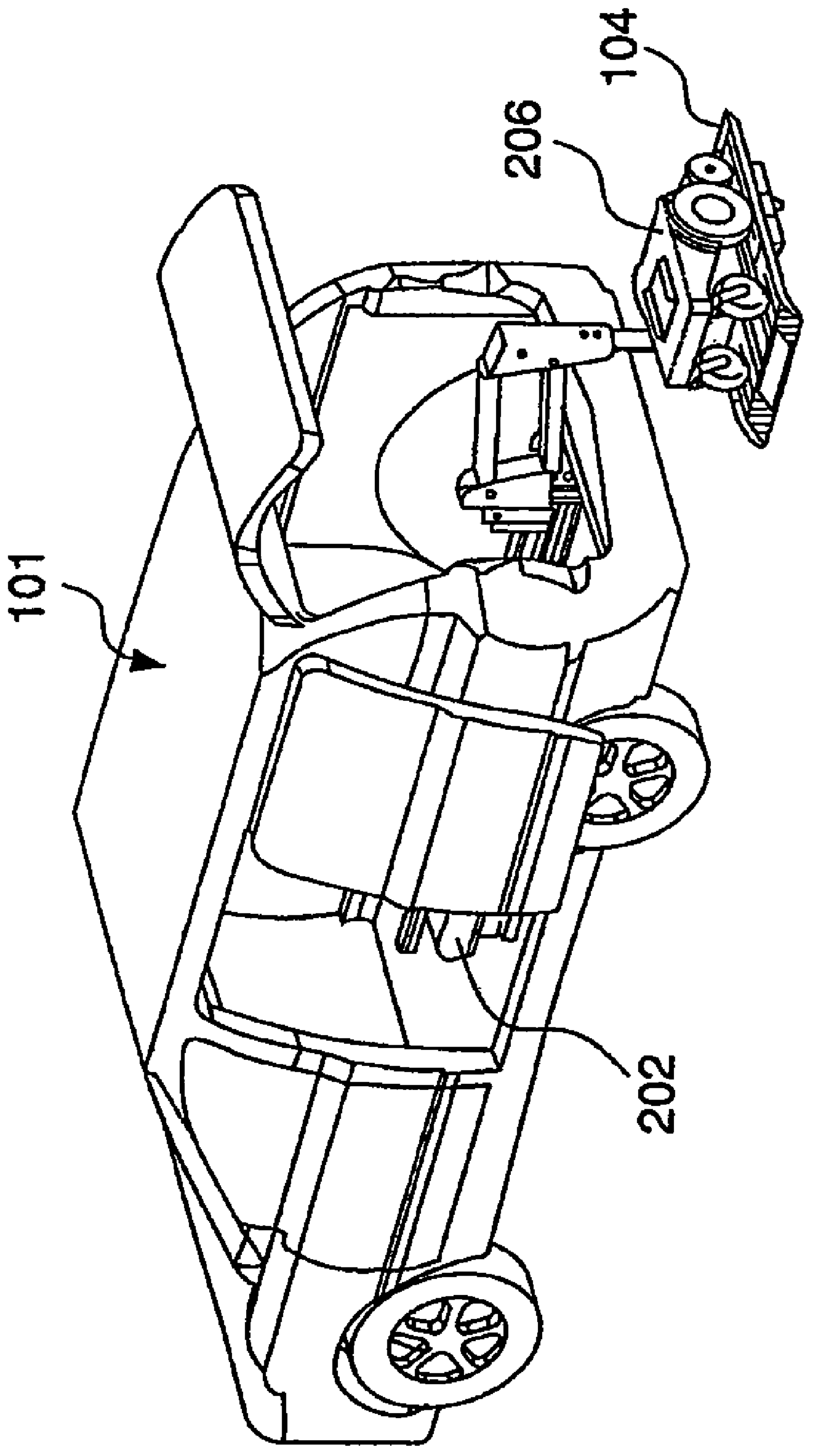
Figure 28H:
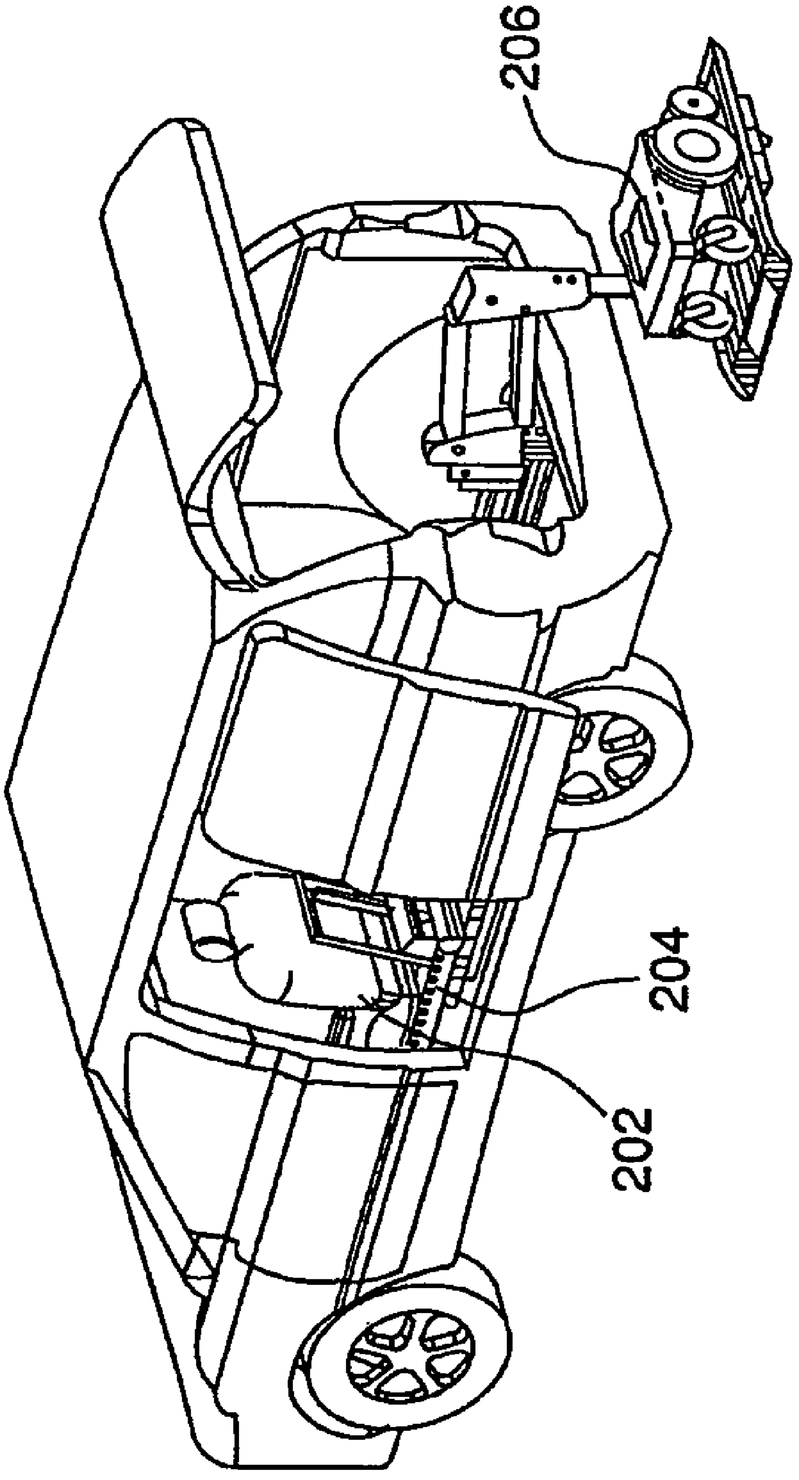

Once the seat 202 has been removed from the base 212, the system 10 can guide the base 212 to the stored position on the lift and carrier assembly 104, as depicted in FIGS. 28D-28F.

What is claimed is:

1. A system for guiding a personal-transportation vehicle between a first and a second position proximate a motor vehicle, comprising:

a vision system capable of being mounted on the motor vehicle and comprising a camera and a processor communicatively coupled to the camera, for generating information representing a visual image of the personal-transportation vehicle;

a first computing device communicatively coupled to the vision system for generating guidance information for the personal-transportation vehicle and guiding the personal-transportation vehicle along a first portion of a predetermined course based on the information representing a visual image of the personal-transportation vehicle;

a proximity sensor capable of being mounted on the personal-transportation vehicle for generating information relating to an actual distance between the personal-transportation vehicle and the motor vehicle;

an odometry system for determining a displacement of the personal-transportation vehicle; and a second computing device communicatively coupled to the proximity sensor and the odometry system for generating guidance information for the personal-transportation vehicle and guiding the personal-transportation vehicle along a second portion of the predetermined course based on: a difference between the actual and a predetermined desired distance between the personal-transportation vehicle and the motor vehicle; and the displacement of the personal-transportation vehicle.

2. The system of claim 1, wherein the proximity sensor is a laser rangefinder.

3. The system of claim 1, wherein the second computing device can guide the personal-transportation vehicle along the second portion of the predetermined course by comparing the actual distance of the personal-transportation vehicle from the motor vehicle as determined by the proximity sensor to the predetermined desired distance of the personal-transportation vehicle from the motor vehicle, and generating guidance information for the personal-transportation vehicle to reduce a difference between the actual distance of the personal-transportation vehicle from the motor vehicle and the predetermined desired distance of the personal-transportation vehicle from the motor vehicle.

4. The system of claim 3, wherein the second computing device has information stored therein representing a profile of a side of the motor vehicle, and the second computing device can guide the personal-transportation vehicle along the second portion of the predetermined course based on the information representing a profile of a side of the motor vehicle.

5. The system of claim 1, wherein the first computing device can guide the personal-transportation vehicle onto and off of a platform of a lift and carrier assembly mounted on the motor vehicle by determining a position and an orientation of the personal-transportation vehicle in relation to the first portion of the predetermined course based on the information representing a visual image of the personal-transportation vehicle, and generating guidance information for the personal-transportation vehicle to direct the personal-transportation vehicle toward the first portion of the predetermined course.

6. The system of claim 5, wherein the first computing device is configured to determine a position and an orientation of the personal-transportation vehicle within a field of view of the camera by recognizing a physical feature of the personal-transportation vehicle using a two-dimensional pattern matching technique.

7. The system of claim 6, wherein the first computing device is further configured to determine the position and the orientation of the personal-transportation vehicle within the field of view of the camera using a feature tracker.

8. The system of claim 1, further comprising a wireless communication system including a wireless bridge communicatively coupled to the second computing device, and a wireless Ethernet router communicatively coupled to the first computing device, and the wireless bridge and the wireless Ethernet router communicate over a local Ethernet network using a UDP over IP protocol.

9. The system of claim 1, wherein the processor of the vision system and the first computing device are communicatively coupled by way of an IEEE 1394 standard Firewire serial link.

10. The system of claim 1, further comprising a lift and carrier assembly capable of being mounted on the motor vehicle for supporting the personal-transportation vehicle on the motor vehicle.

11. The system of claim 1, wherein the second computing device generates a corrective action based on a magnitude and direction of a position error represented by the difference between the actual and the predetermined desired distance between the personal-transportation vehicle and the motor vehicle.

12. The system of claim 1, wherein the odometry system comprises an encoder for measuring an angular displacement of a wheel of the personal-transportation vehicle, and a gyroscope for determining an orientation of the personal-transportation vehicle.

13. A system for guiding a personal-transportation vehicle between a first and a second position proximate a motor vehicle, comprising:

a laser rangefinder for generating information relating to a distance between the personal-transportation vehicle and the motor vehicle;

a vision system comprising a camera and a processor communicatively coupled to the camera, for generating information corresponding to a visual image of the personal transportation vehicle;

a first computing device for guiding the personal-transportation vehicle along a first portion of a predetermined course based on the information relating to a distance between the personal-transportation vehicle and the motor vehicle; and a second computing device for guiding the personal-transportation vehicle along a second portion of the predetermined course based on the information corresponding to a visual image of the personal transportation vehicle.

* * * * *